(12) United States Patent
Ookubo

(10) Patent No.: US 8,102,605 B2
(45) Date of Patent: Jan. 24, 2012

(54) ZOOM LENS AND IMAGE PICKUP APPARATUS INCLUDING THE SAME

(75) Inventor: Yousuke Ookubo, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/633,022

(22) Filed: Dec. 8, 2009

(65) Prior Publication Data

US 2010/0149654 A1   Jun. 17, 2010

(30) Foreign Application Priority Data

Dec. 11, 2008 (JP) ................ 2008-315545

(51) Int. Cl.
*G02B 15/14* (2006.01)
(52) U.S. Cl. ........ 359/687; 359/683; 359/684; 359/685; 359/715; 359/740; 359/774
(58) Field of Classification Search .......... 359/683–687, 359/715, 740, 774
See application file for complete search history.

(56) References Cited

U.S. PATENT DOCUMENTS

| | | | |
|---|---|---|---|
| 6,867,925 B1 | 3/2005 | Sato | |
| 7,151,638 B2 | 12/2006 | Ohashi | |
| 7,167,320 B2 | 1/2007 | Ohashi | |
| 7,333,274 B2 | 2/2008 | Hozumi | |
| 2007/0217024 A1 | 9/2007 | Kamo | |
| 2008/0088944 A1* | 4/2008 | Watanabe | 359/687 |

* cited by examiner

*Primary Examiner* — Evelyn A. Lester
(74) *Attorney, Agent, or Firm* — Canon U.S.A., Inc. IP Division

(57) ABSTRACT

A zoom lens includes first to fourth lens units in order from the object side to the image side. The first, third, and fourth lens units have a positive refractive power. The second lens unit has a negative refractive power. Distances between the lens units are changed during zooming. The first lens unit is composed of a cemented lens including a first lens having a negative refractive power and a second lens having a positive refractive power arranged in order from the object side to the image side. The Nd1a and vd1a are a refractive index and an Abbe number, respectively, of a material of the first lens for the d-line and are adequately set.

22 Claims, 17 Drawing Sheets

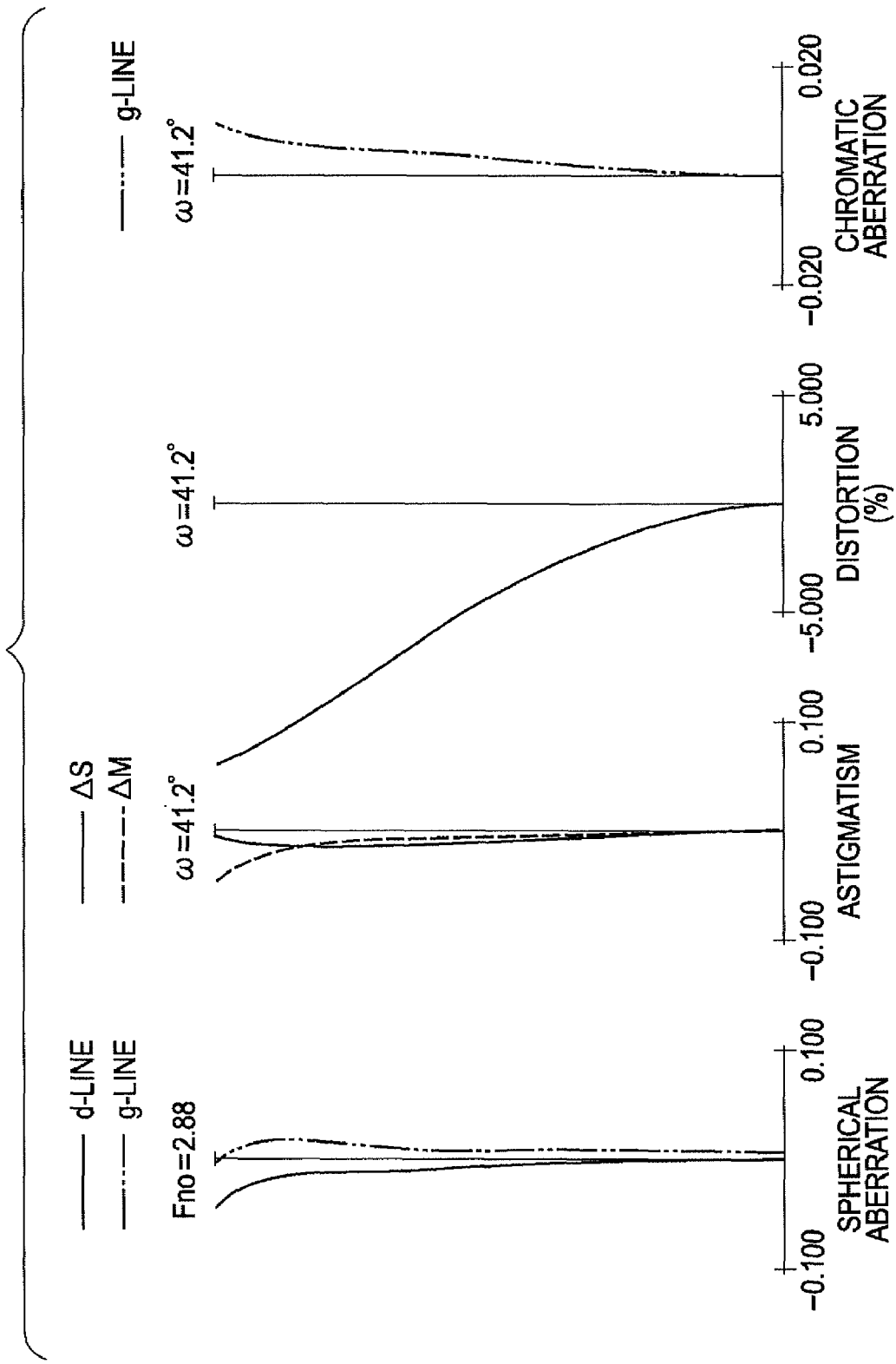

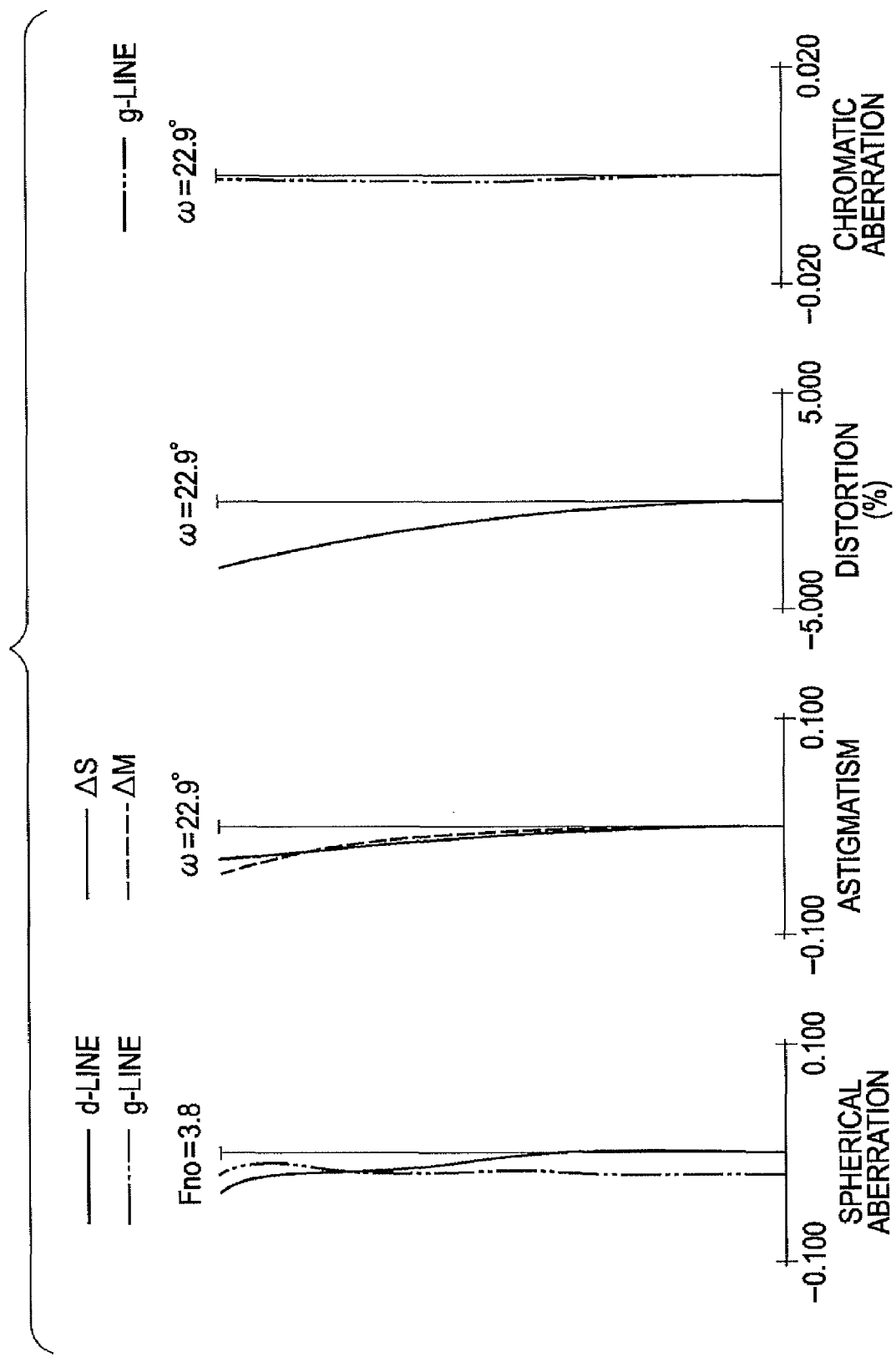

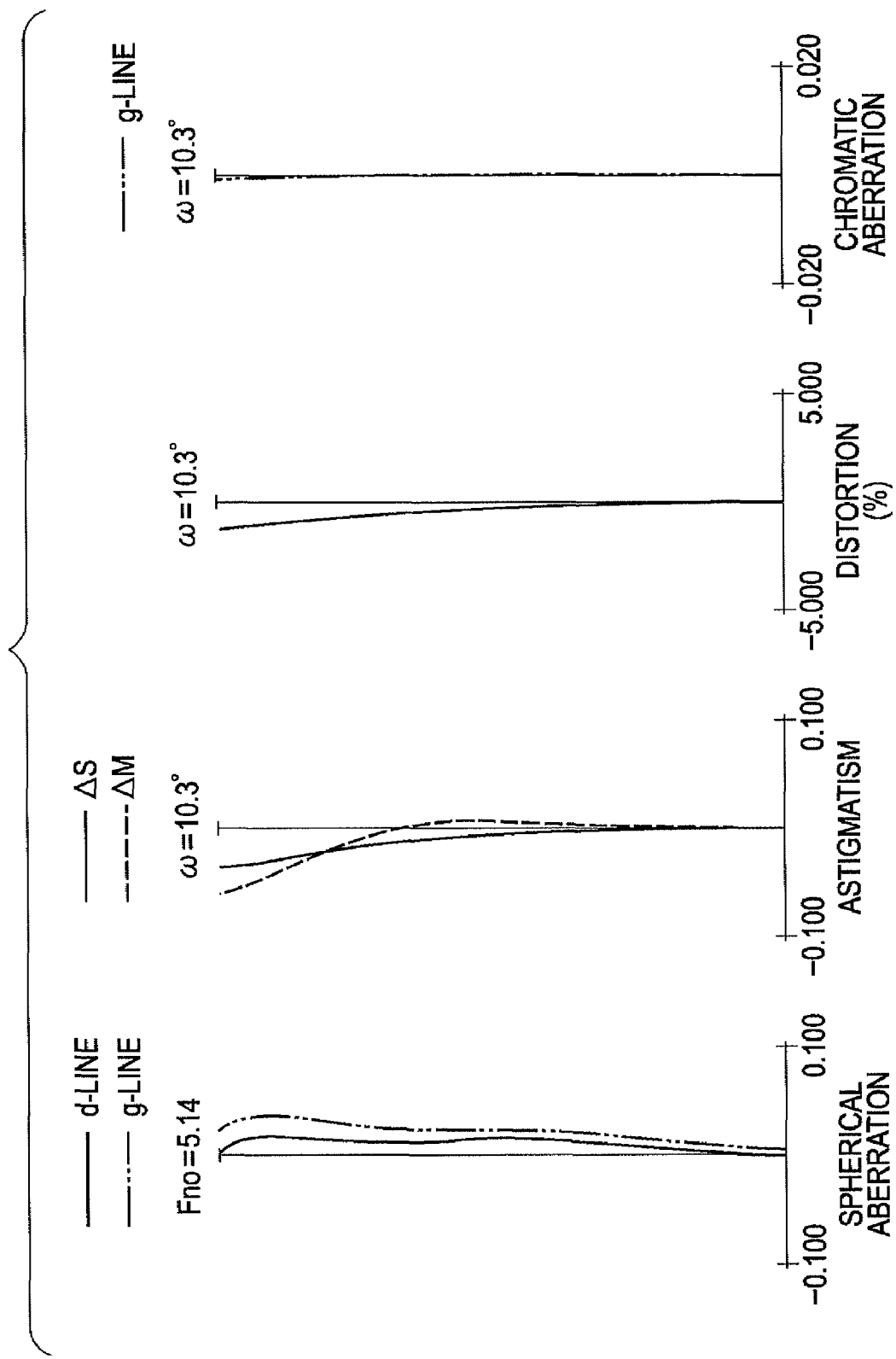

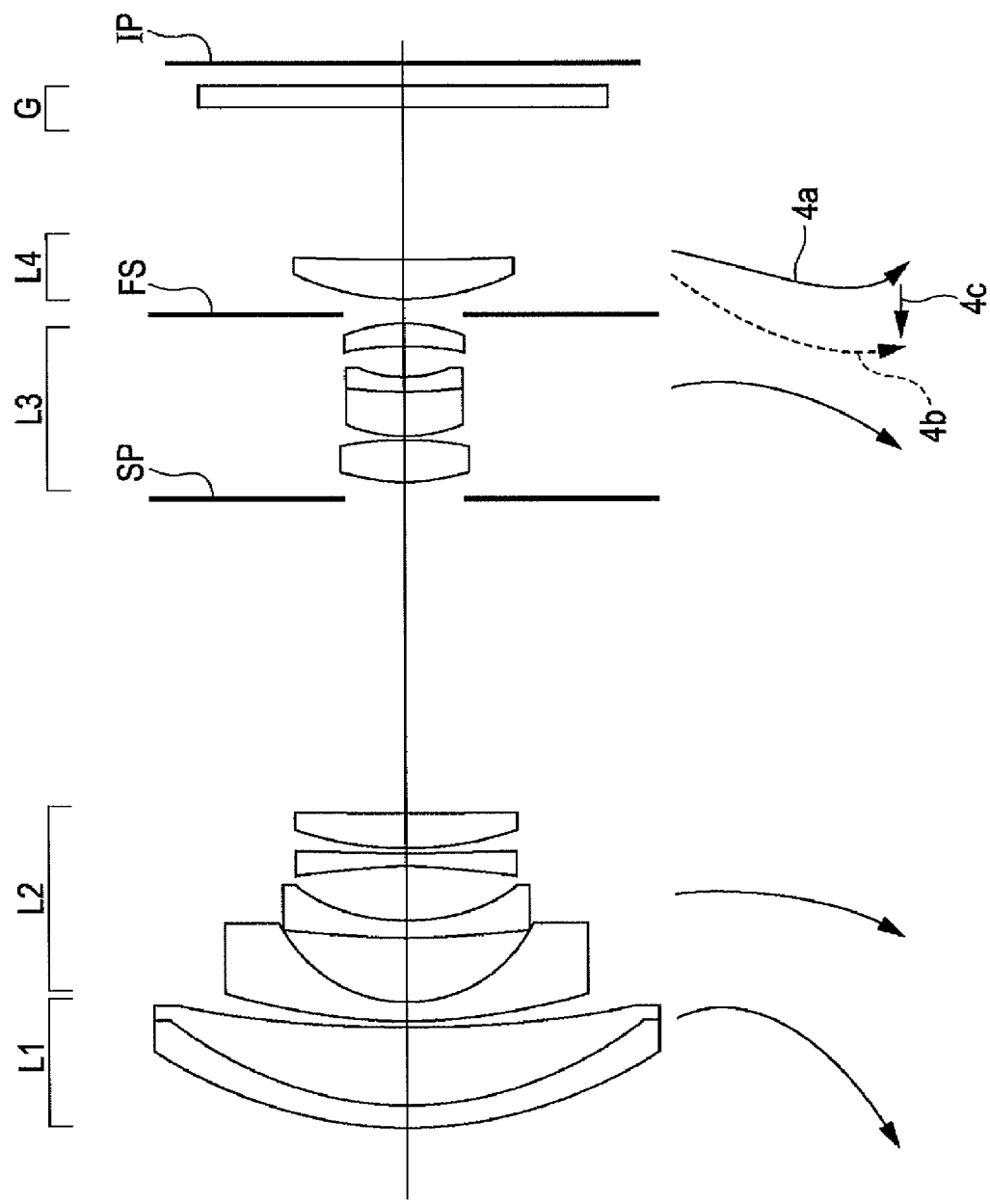

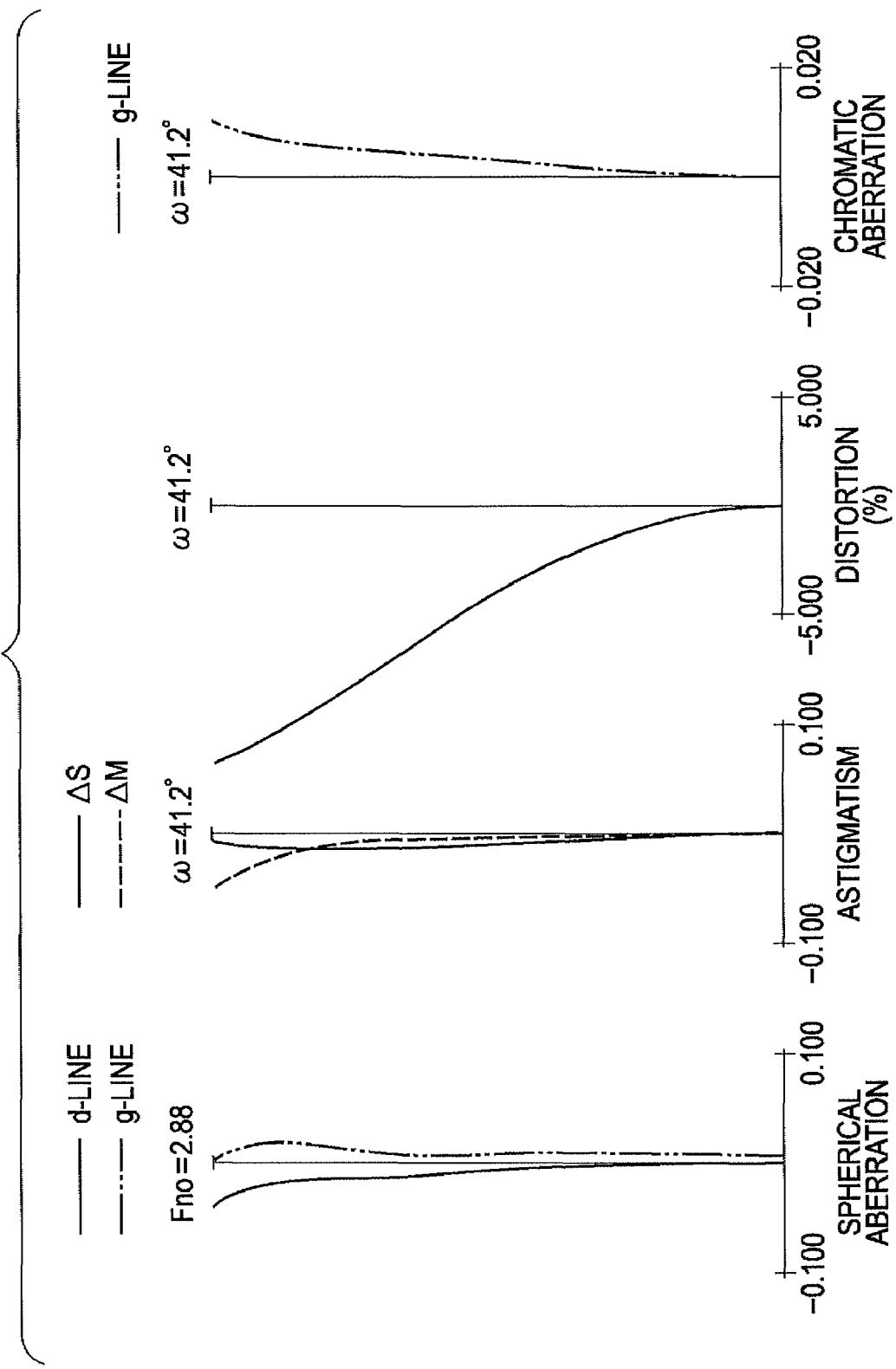

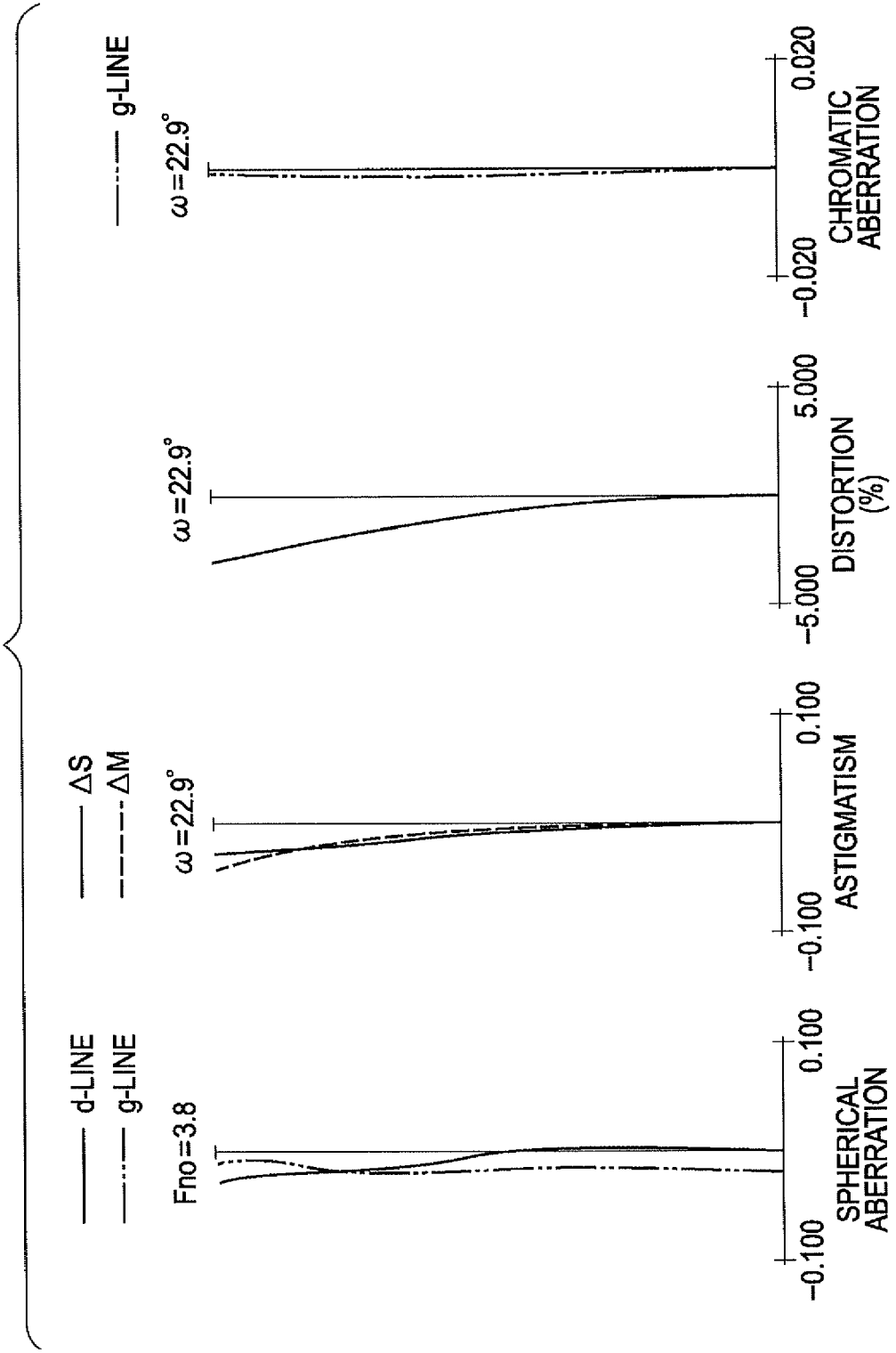

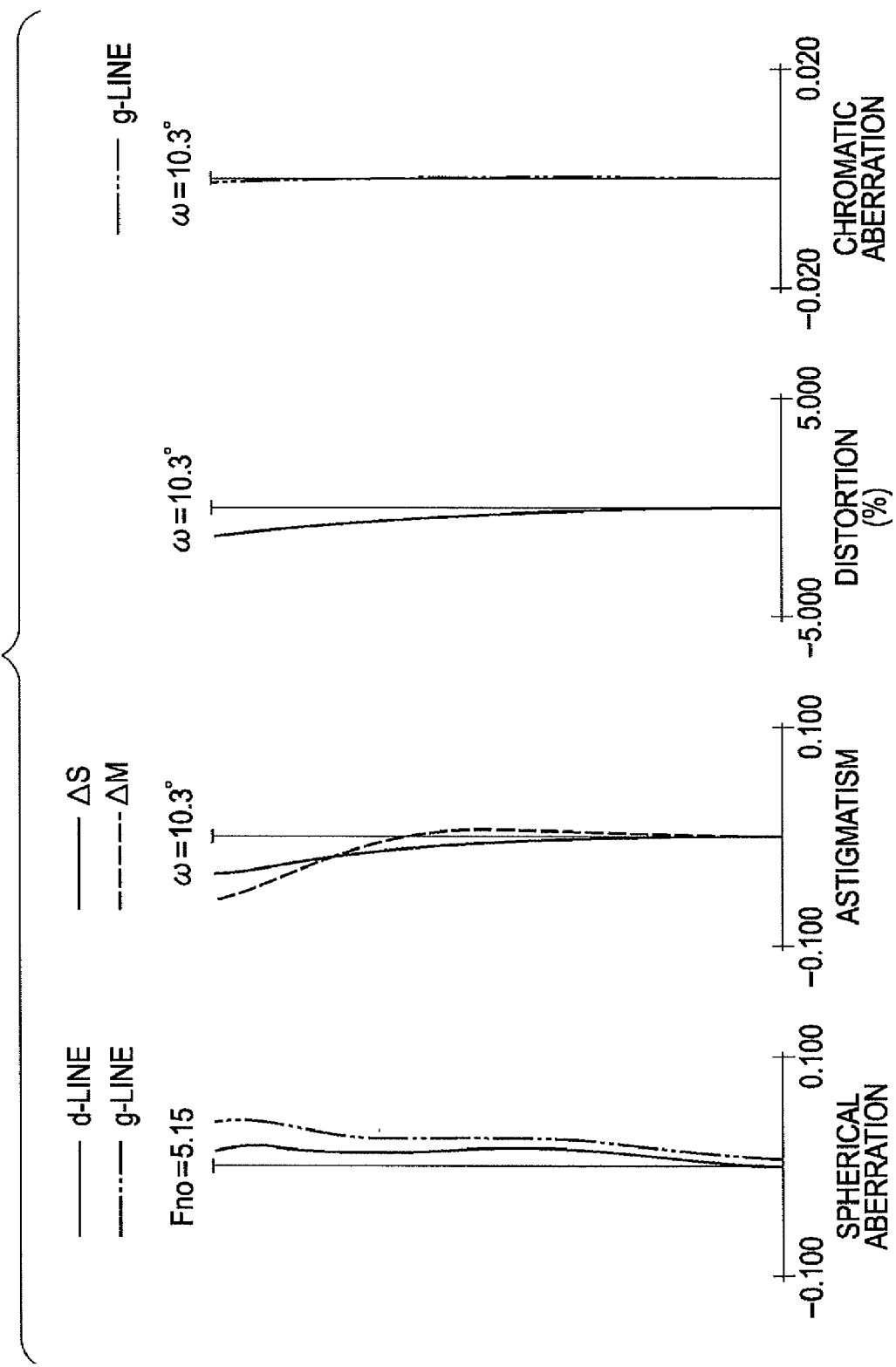

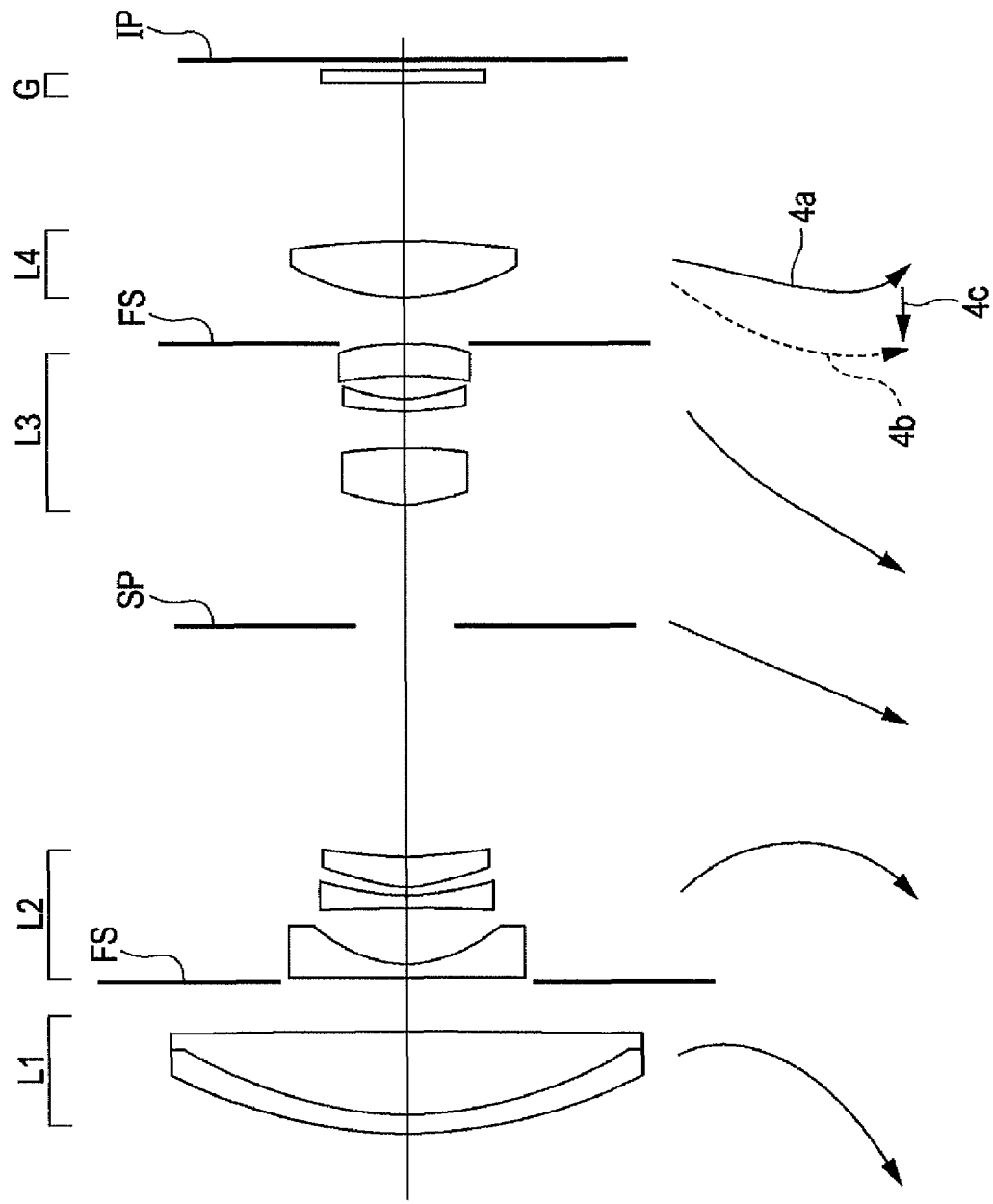

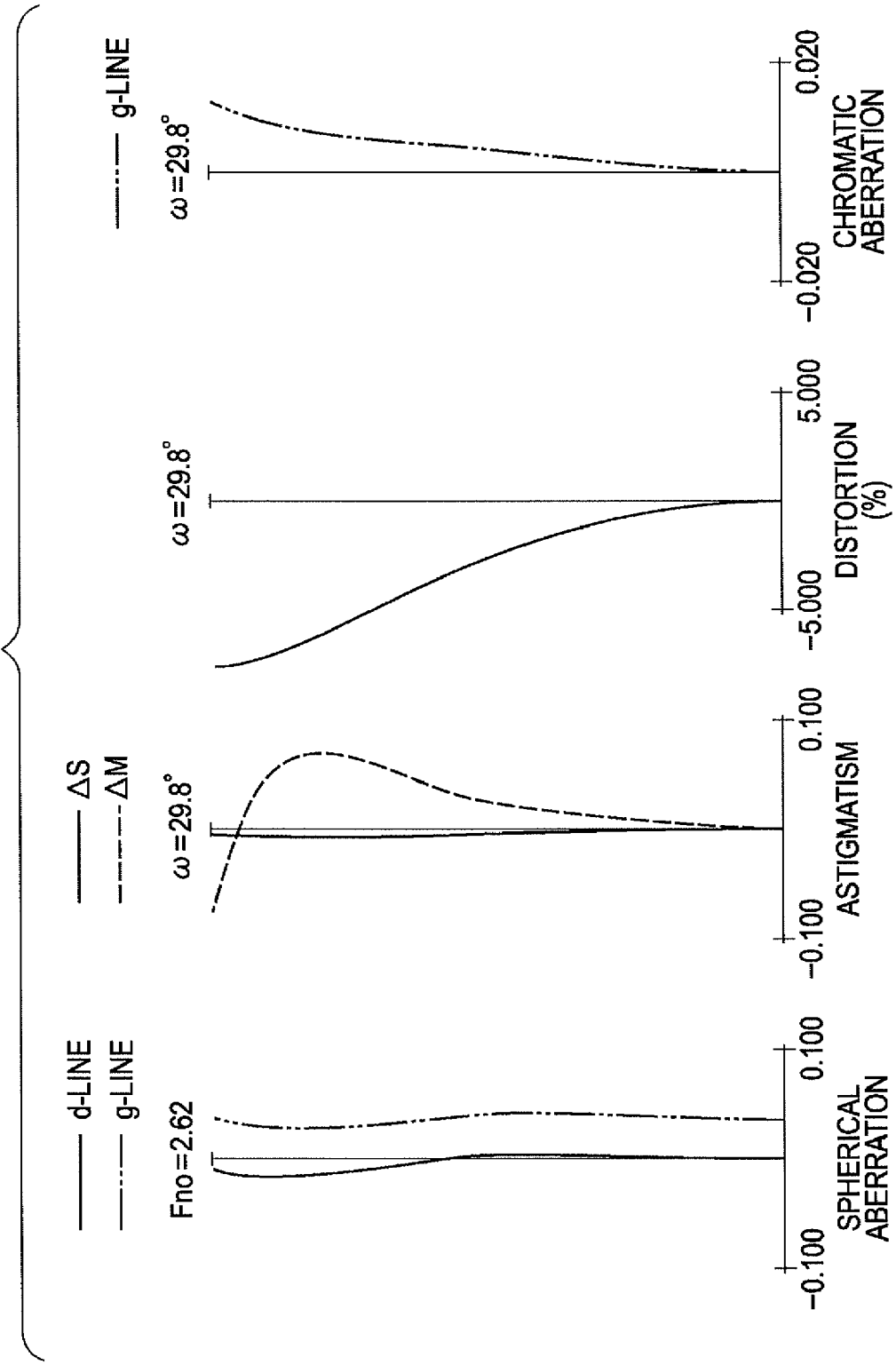

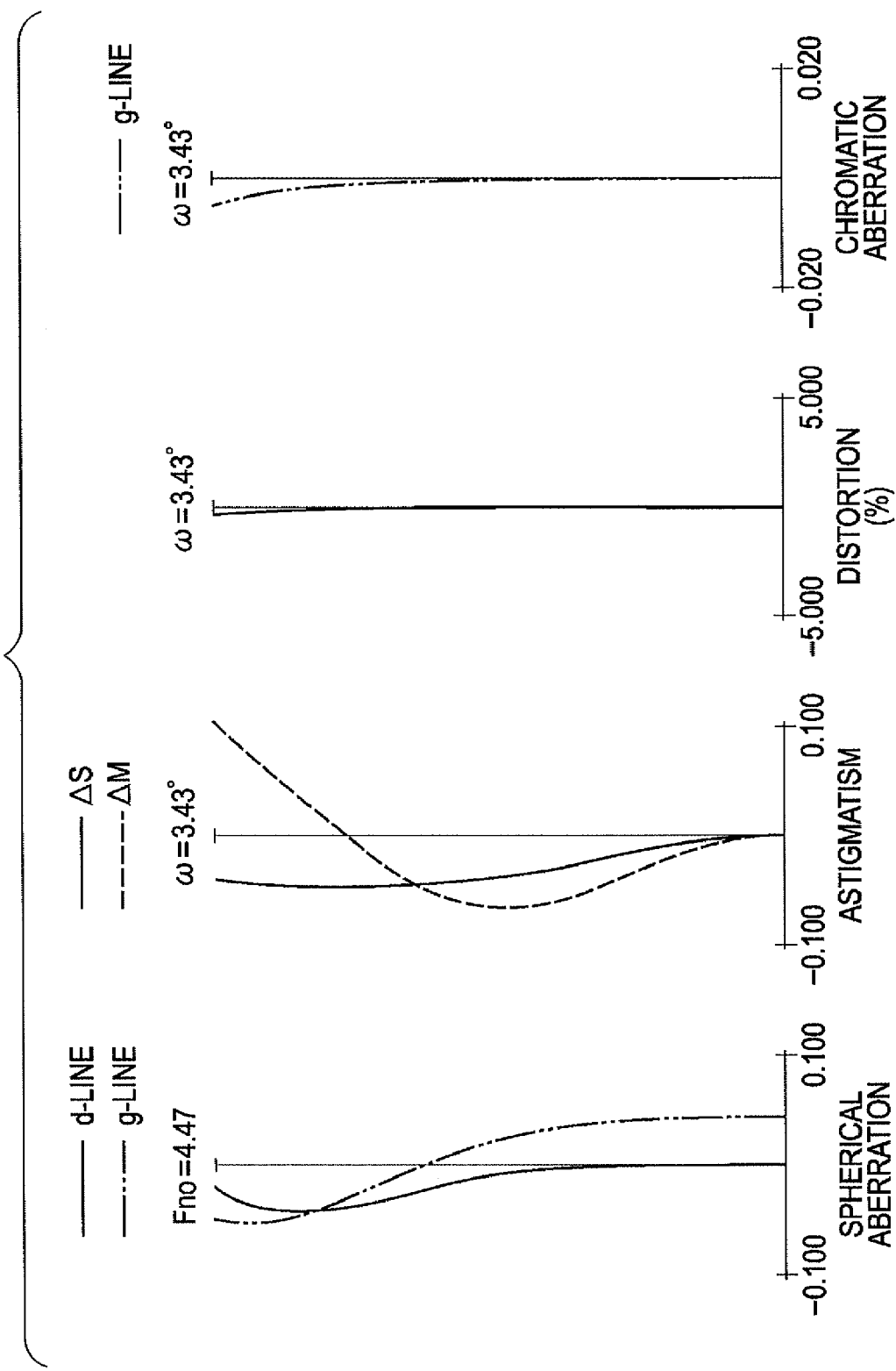

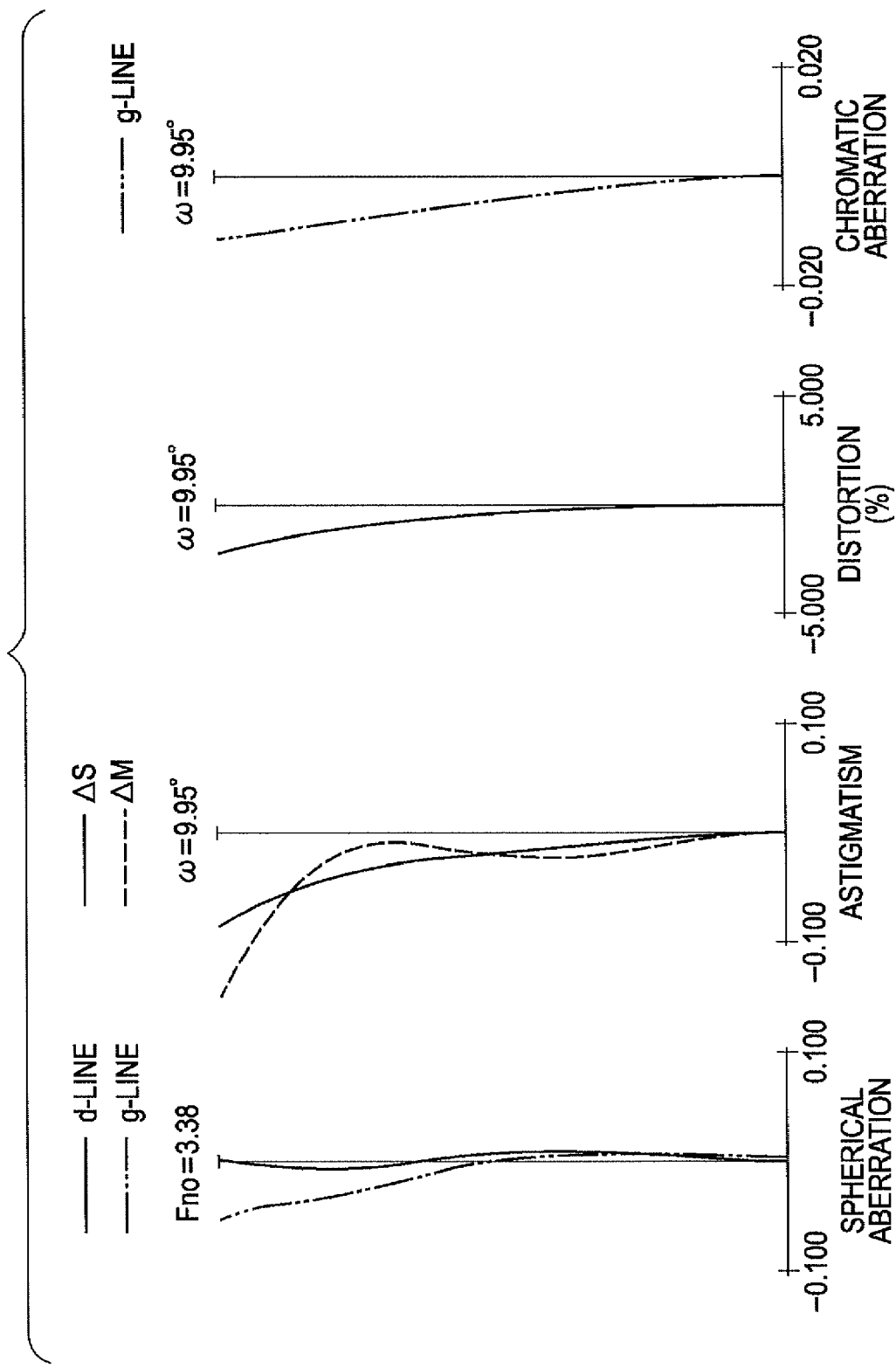

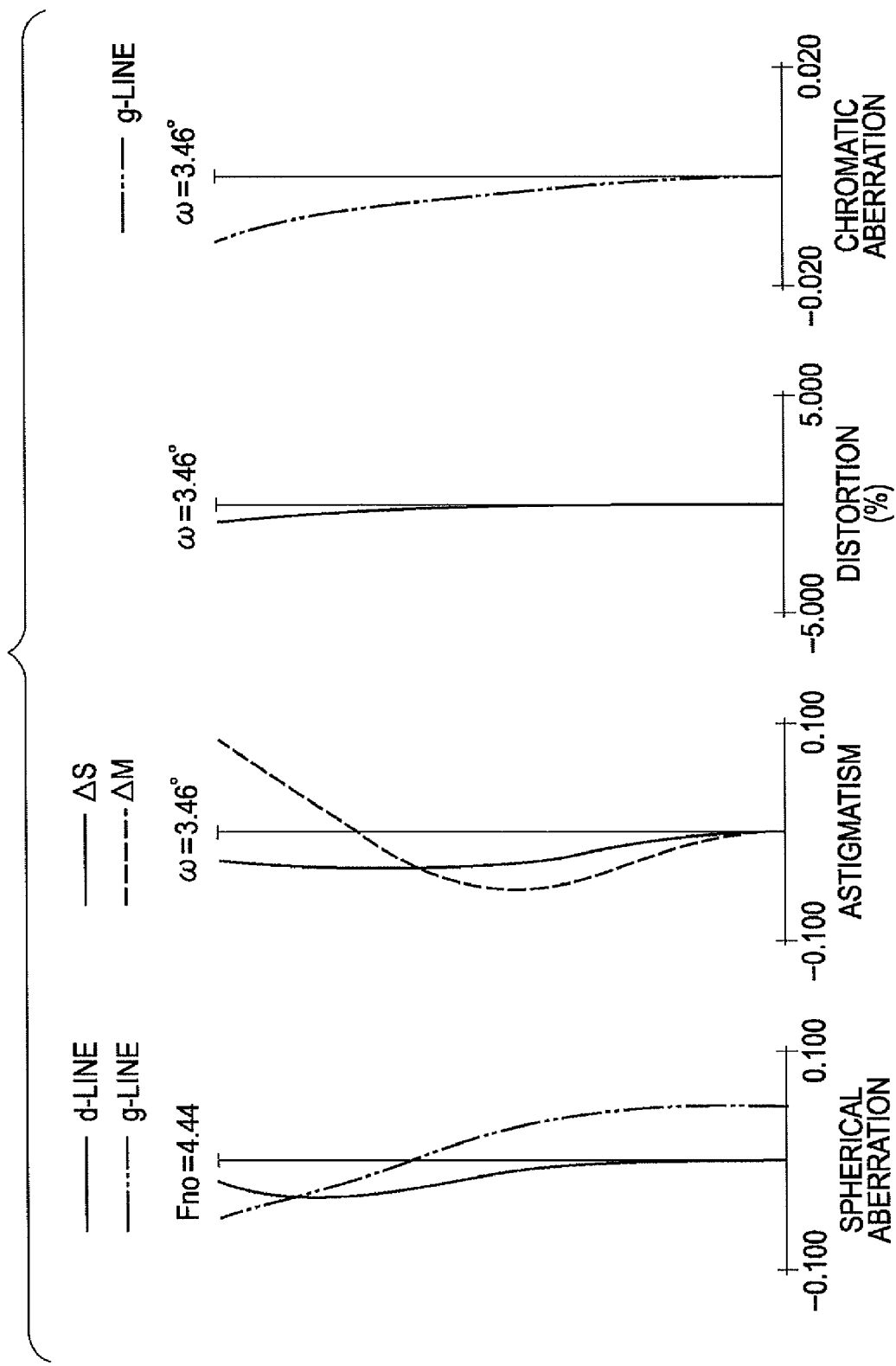

ZOOM LENS AND IMAGE PICKUP APPARATUS INCLUDING THE SAME

BACKGROUND OF THE INVENTION

1. Field of the Invention

The present invention relates to a zoom lens, more particularly an image pickup apparatus including the zoom lens.

2. Description of the Related Art

Recently, image pickup apparatuses, such as video cameras, digital still cameras, broadcast cameras, and surveillance cameras, which include solid-state image pickup elements, such as CCD and CMOS, and cameras using silver-halide films have become smaller with increased functionality.

Accordingly, demand has increased for small, wide-field-angle, high-zoom-ratio (high-magnification-variation-ratio) zoom lenses having a small length and high resolution for use in imaging optical systems of the image pickup apparatuses.

To comply with such a demand, a positive-lead zoom lens has been proposed in which a lens unit having a positive refractive power is disposed at the object side.

An example of a positive-lead zoom lens is a four-unit zoom lens including a first lens unit having a positive refractive power, a second lens unit having a negative refractive power, a third lens unit having a positive refractive power, and a fourth lens unit having a positive refractive power in order from the object side to the image side.

A four-unit zoom lens having a simple structure in which the first lens unit is composed of a single negative lens and a single positive lens is described in U.S. Patent Application Publication No. 2007/0217024 and U.S. Pat. Nos. 7,151,638 and 7,167,320.

In addition, a four-unit zoom lens in which the first lens unit is composed of a cemented lens including a negative lens and a positive lens and in which the second lens unit is composed of three negative lenses and a single positive lens is described in U.S. Pat. Nos. 7,333,274 and 6,867,925.

In general, the size of the entire zoom lens can be reduced while maintaining a predetermined zoom ratio by increasing the refractive power of each lens unit included in the zoom lens and reducing the number of lenses.

However, in this type of zoom lens, as the refractive power of each lens surface increases, the lens thickness also increases and it becomes difficult to correct the aberrations.

In the above-described four-unit zoom lens, to achieve an increase in the zoom ratio and reduction in the size of the entire lens system while maintaining good optical performance, it is important to adequately set the refractive power of each lens unit, the lens structure, and the moving condition of each lens unit during zooming.

In particular, it is important to adequately set the moving condition of each lens unit during zooming, the refractive power (reciprocal of focal length) of the first lens unit, and the structure of each of the lenses included in the first lens unit.

It is extremely difficult to obtain a high zoom ratio and high optical performance over the entire zoom range unless the above-described factors are adequately set.

SUMMARY OF THE INVENTION

A zoom lens according to an aspect of the present invention includes a first lens unit having a positive refractive power; a second lens unit having a negative refractive power; a third lens unit having a positive refractive power; and a fourth lens unit having a positive refractive power. The first, second, third and fourth lens units are arranged in order from the object side to the image side, respectively. Distances between the lens units are changed during zooming. The first lens unit is composed of a cemented lens including a first lens having a negative refractive power and a second lens having a positive refractive power arranged in order from the object side to the image side. When Nd1a and vd1a are a refractive index and an Abbe number, respectively, of a material of the first lens for the d-line, the following conditions are satisfied:

$$vd1a < 23.8 \quad (1)$$

$$Nd1a > 0.0186 \times vd1a + 1.594 \quad (2)$$

Further features of the present invention will become apparent from the following description of exemplary embodiments with reference to the attached drawings.

BRIEF DESCRIPTION OF THE DRAWINGS

FIGS. 2A to 2C are aberration diagrams of the zoom lens according to the first embodiment of the present invention.

FIG. 3 is a sectional view of a zoom lens according to a second embodiment of the present invention.

FIGS. 4A to 4C are aberration diagrams of the zoom lens according to the second embodiment of the present invention.

FIG. 5 is a sectional view of a zoom lens according to a third embodiment of the present invention.

FIGS. 6A to 6C are aberration diagrams of the zoom lens according to the third embodiment of the present invention.

FIGS. 8A to 8C are aberration diagrams of the zoom lens according to the fourth embodiment of the present invention.

DESCRIPTION OF THE EMBODIMENTS

Embodiments of the present invention will be described in detail with reference to the accompanying drawings.

Each of zoom lenses according to the embodiments of the present invention includes a first lens unit having a positive refractive power, a second lens unit having a negative refractive power, a third lens unit having a positive refractive power, and a fourth lens unit having a positive refractive power in order from the object side to the image side.

During zooming, lens units are moved such that distances between the lens units are changed.

According to each embodiment of the present embodiment, a lens unit having a refractive power may be disposed on the object side of the first lens unit or on the image side of the fourth lens unit.

Figure 1:
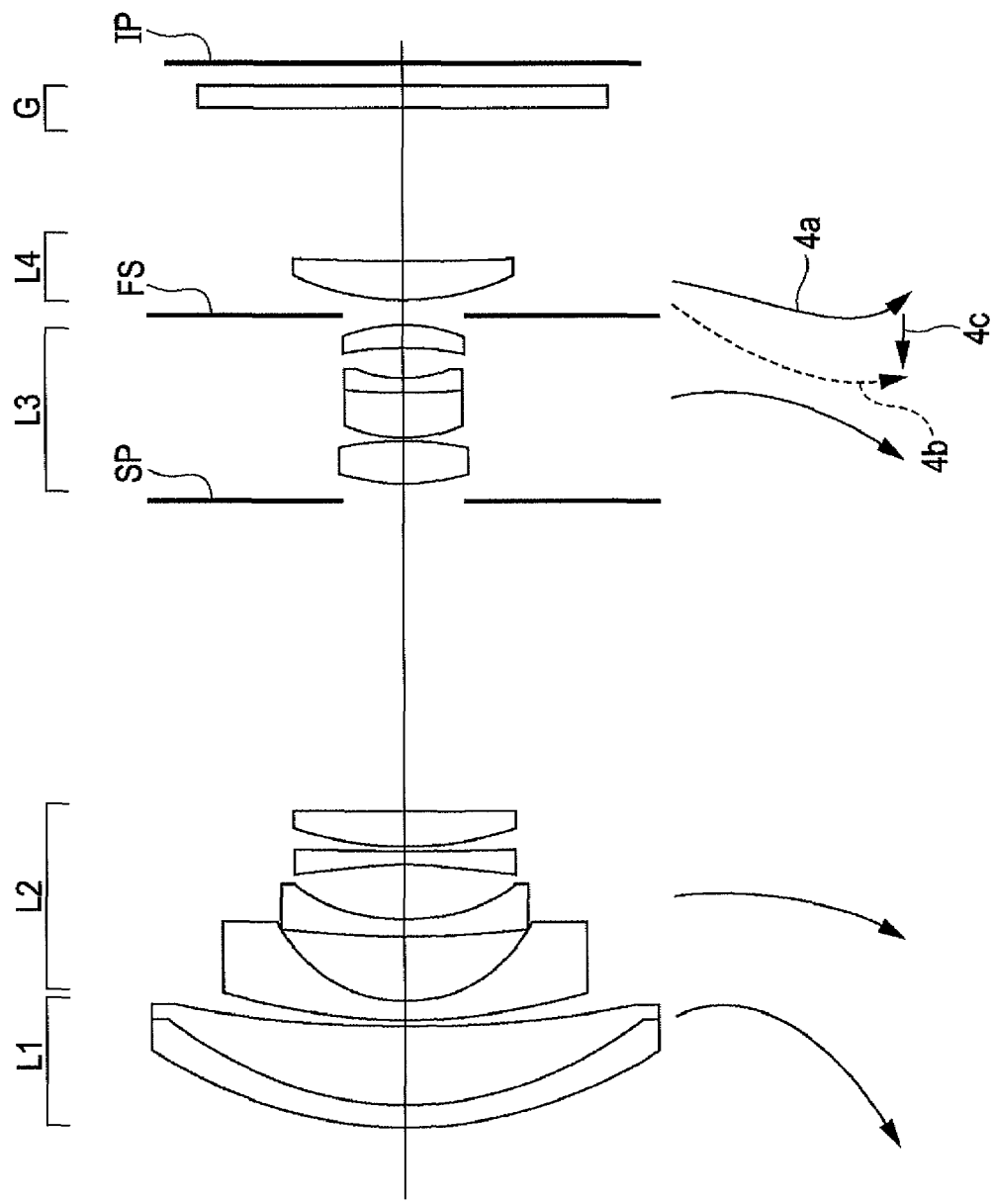
FIG. 1 is a sectional view of a zoom lens according to a first embodiment of the present invention.

FIG. 1 is a sectional view of a zoom lens system according to a first embodiment at the wide-angle end. FIGS. 2A to 2C illustrate aberration diagrams of the zoom lens according to the first embodiment at the wide-angle end (short-focallength end), an intermediate focal length (intermediate zoom position), and the telephoto end (long-focal-length end), respectively.

FIG. 3 is a sectional view of a zoom lens system according to a second embodiment at the wide-angle end. FIGS. 4A to 4C illustrate aberration diagrams of the zoom lens according to the second embodiment at the wide-angle end, the intermediate focal length, and the telephoto end, respectively.

Figure 6B:
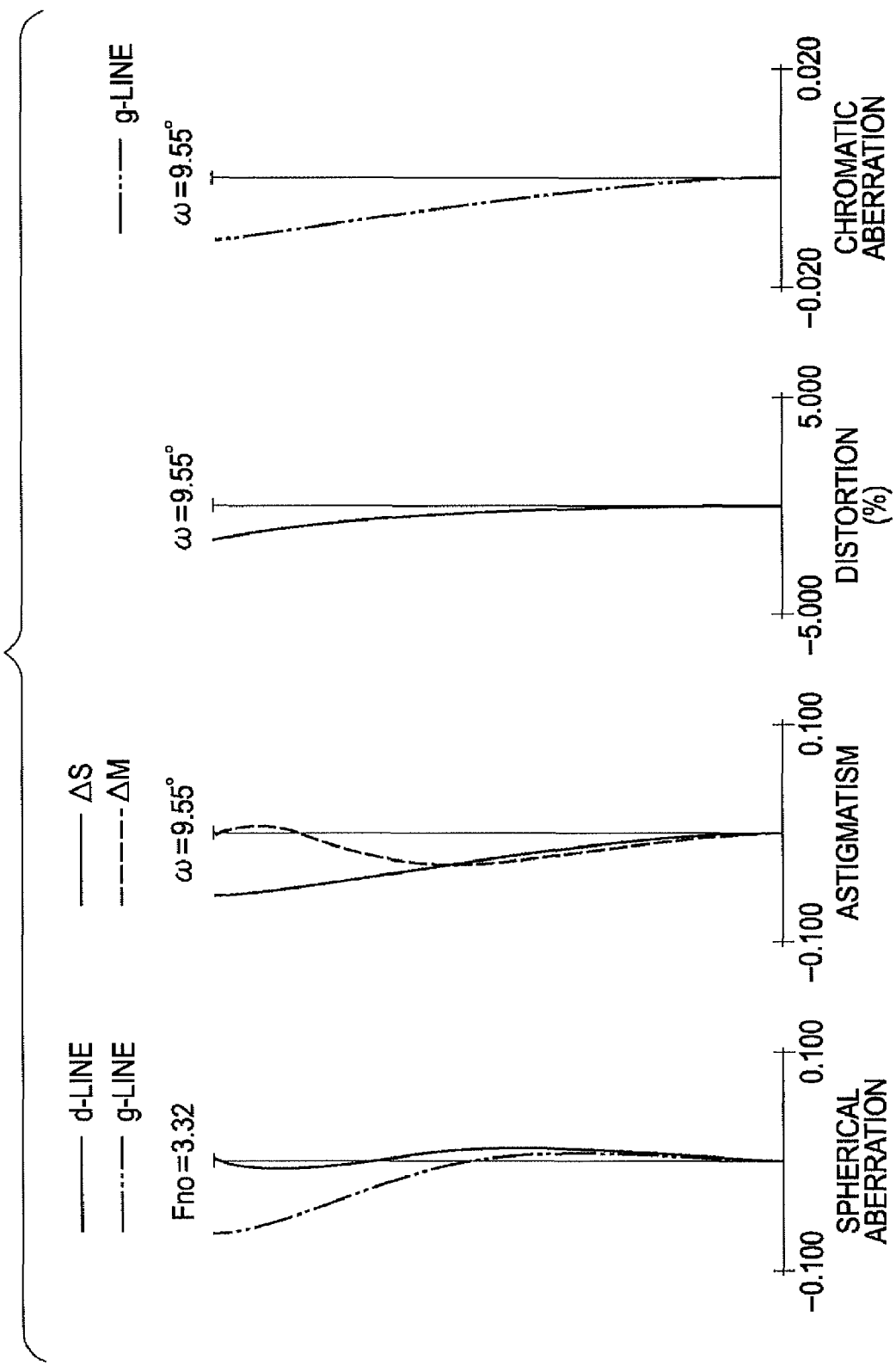

FIG. 5 is a sectional view of a zoom lens system according to a third embodiment at the wide-angle end. FIGS. 6A to 6C illustrate aberration diagrams of the zoom lens according to the third embodiment at the wide-angle end, the intermediate focal length, and the telephoto end, respectively.

Figure 7:
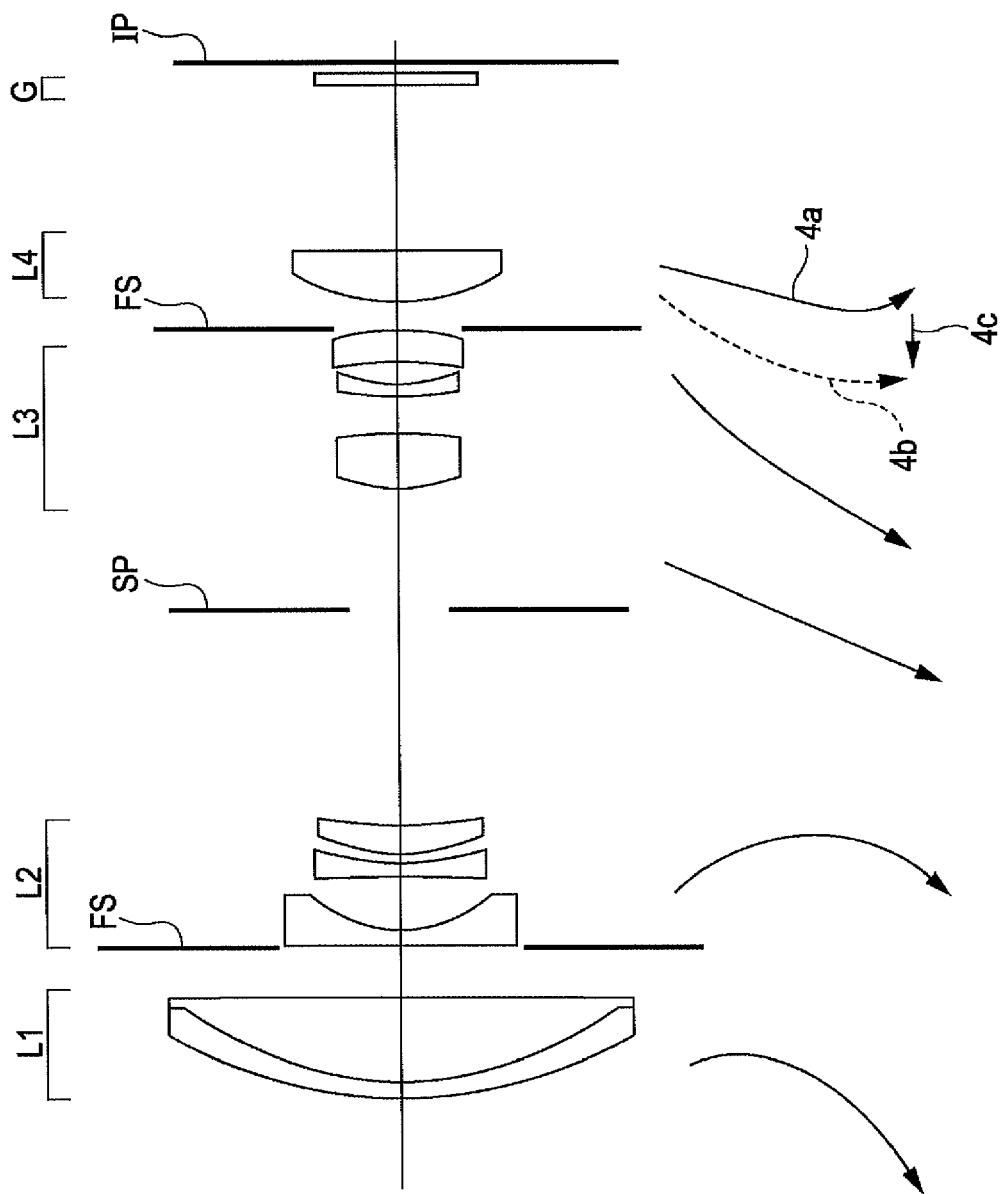
FIG. 7 is a sectional view of a zoom lens according to a fourth embodiment of the present invention.
Figure 8A:
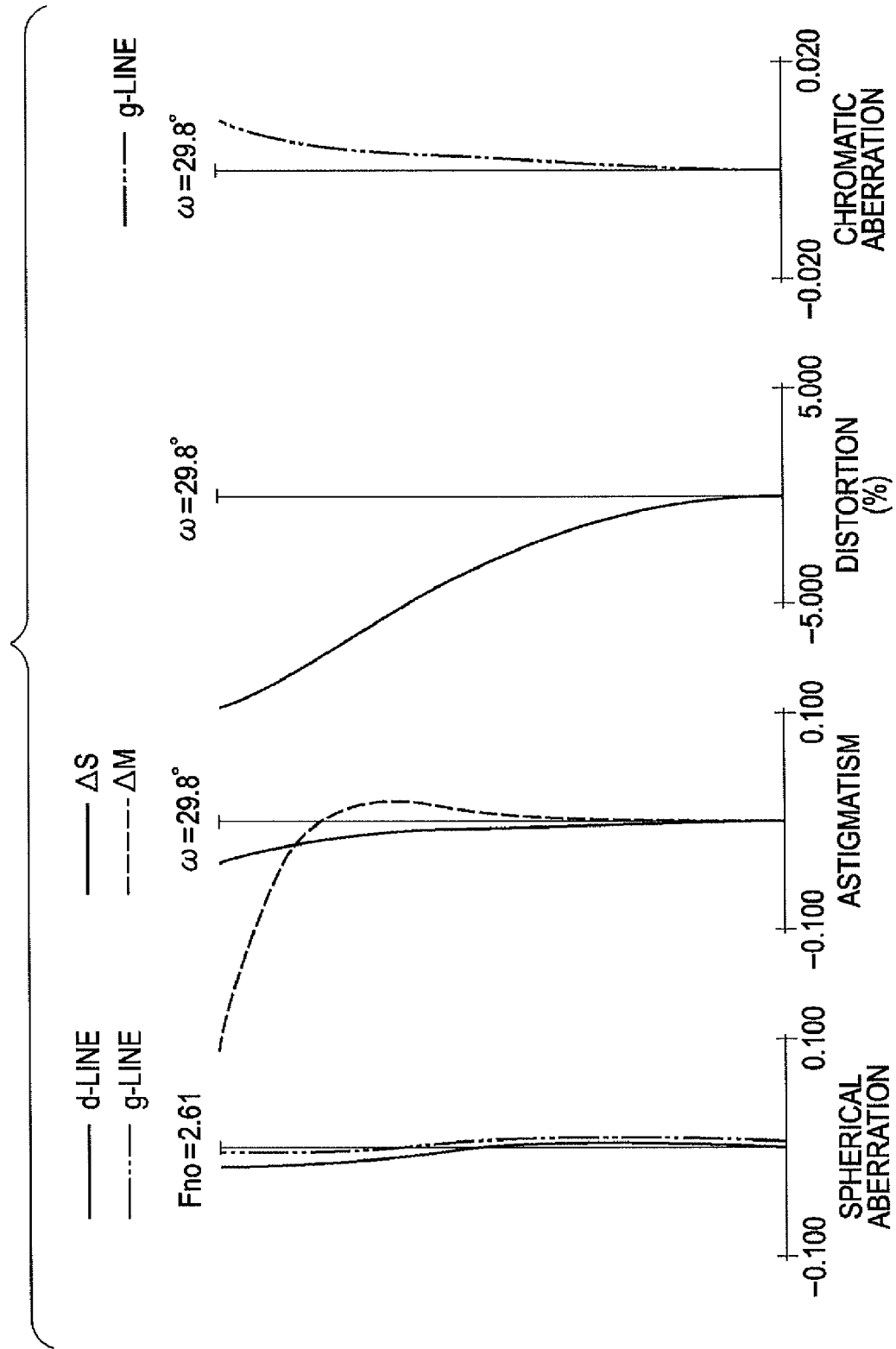

FIG. 7 is a sectional view of a zoom lens system according to a fourth embodiment at the wide-angle end. FIGS. 8A to 8C illustrate aberration diagrams of the zoom lens according to the fourth embodiment at the wide-angle end, the intermediate focal length, and the telephoto end, respectively.

Figure 9:
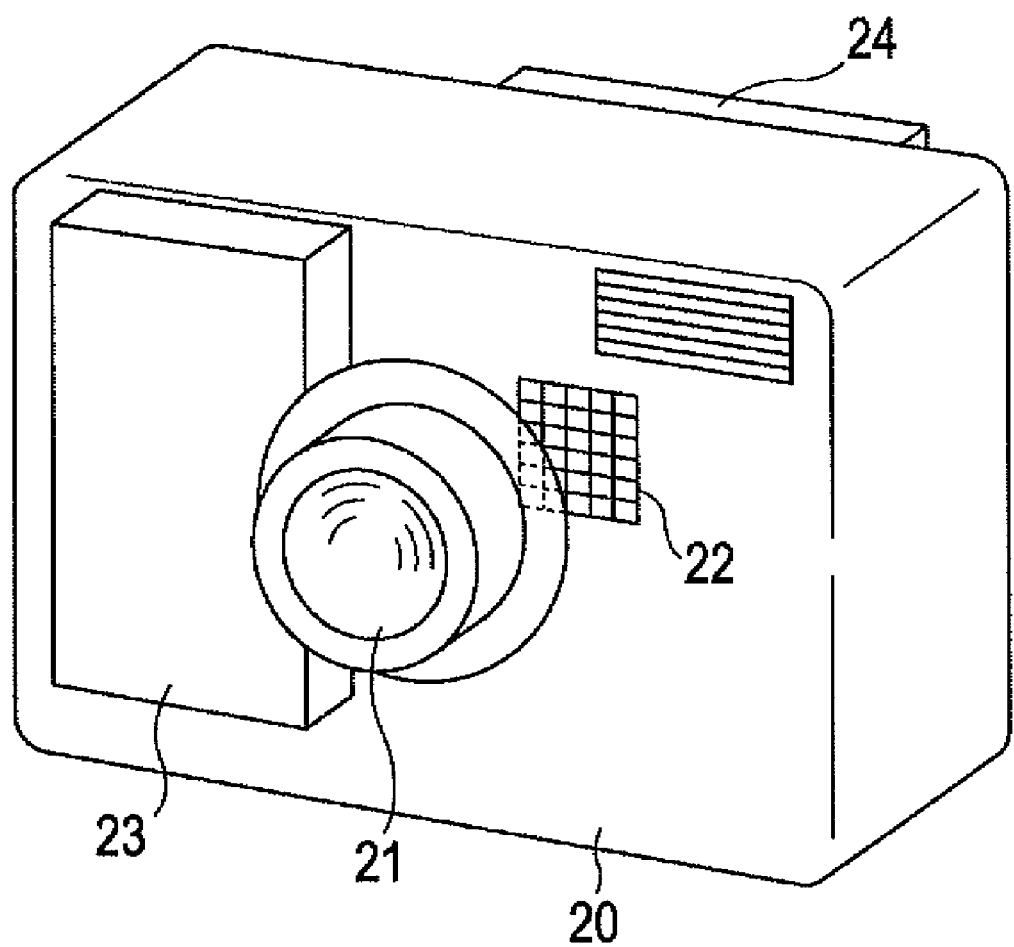
FIG. 9 is a schematic diagram illustrating the main part of an image pickup apparatus according to an embodiment of a present invention.

FIG. 9 is a schematic diagram illustrating the main part of a camera (image pickup apparatus) including a zoom lens according to an embodiment of the present invention.

The zoom lens according to each embodiment is an imaging lens system included in an image pickup apparatus, such as a video camera or a digital camera. In each sectional view, the left side shows the object side (front) and the right side shows the image side (rear).

In addition, in each sectional view, i denotes the number of each lens unit counted from the object side, and Li denotes the $i^{th}$ lens unit.

Each zoom lens system includes a first lens unit L1 having a positive refractive power (optical power=reciprocal of focal length), a second lens unit L2 having a negative refractive power, a third lens unit L3 having a positive refractive power, and a fourth lens unit L4 having a positive refractive power.

SP denotes an aperture stop, which is disposed on the object side of the third lens unit L3. FS denotes a flare cutting stop, which is disposed on the image side of the third lens unit L3 and/or the object side of the second lens unit L2.

G denotes an optical block corresponding to, for example, an optical filter, a faceplate, a crystal low-pass filter, and an infrared-cut filter.

IP denotes an image plane. In the case where the zoom lens is used as an imaging optical system of a video camera or a digital still camera, an image pickup plane of a solid-state image pickup element (photoelectric conversion element), such as a CCD sensor or a CMOS sensor, is positioned at the image plane IP.

In the aberration diagrams, d and g show the d-line and the g-line, respectively, and ΔM and ΔS show a meridional image plane and a sagittal image plane, respectively. The chromatic aberration of magnification is shown by the g-line. In addition, w is a half field angle and Fno is an F-number.

In each embodiment, the wide-angle end and the telephoto end are zoom positions corresponding to the states in which the magnification-varying lens unit (second lens unit) is at one and other ends of a mechanically moveable range along an optical axis.

In each embodiment, the lens units L1 to L4 are moved as shown by the arrows during zooming from the wide-angle end to the telephoto end.

The zoom lens according to each embodiment is a four-unit zoom lens including a lens unit having a positive refractive power, a lens unit having a negative refractive power, a lens unit having a positive refractive power, and a lens unit having a positive refractive power. A reduction in size of the entire system and an increase in the zoom ratio can be easily achieved by using a positive-lead zooming method.

In each embodiment, during zooming, the first lens unit L1 is moved such that the position of the first lens unit L1 at the telephoto end is closer to the object side than that at the wide-angle end. Accordingly, the zoom ratio (magnification variation ratio) can be increased without increasing the overall lens length at the wide-angle end.

In addition, since the first lens unit L1 and the second lens unit L2 are moved closer to each other at the wide-angle end, at which the field angle is large, the diameter of the front lens can be prevented from being increased. A first lens G11 included in the first lens unit L1 which has a relatively large lens diameter is made of a high-refractive-index, high-dispersion maternal so that the field angle can be reduced and the overall size can be reduced.

In each embodiment, the first lens G11 having a negative refractive power is included in the first lens unit L1 having a positive refractive power, and the first lens G11 is made of a high-refractive-index, high-dispersion maternal which satisfies Conditional Expressions (1) and (2) given below. Thus, a difference in the Abbe number between the material of the first lens G11 and the material of a second lens G12 having a positive refractive power which is bonded to the first lens G11 is increased, and the overall thickness of the first lens unit L1 is reduced.

Accordingly, a distance between the front lens and the stop SP and the diameter of the front lens can be reduced. As a result, the size of the entire system can be easily reduced.

The characteristics of the lens structure of each embodiment will now be described. In the first embodiment shown in FIG. 1, during zooming from the wide-angle end to the telephoto end, the first lens unit L1 is moved to the image side, and is then moved to the object side. In other words, the first lens unit L1 is moved along a locus that is convex toward the image side, that is, along a curve that is convex toward the image side.

The second lens unit L2 is also moved along a locus that is convex toward the image side. The third lens unit L3 is also moved along a locus that is convex toward the image side. The fourth lens unit L4 is moved along a locus that is convex toward the object side (along a curve that is convex toward the object side) such that variations in the position of the image plane caused during zooming can be compensated for.

At this time, the lens units are moved such that the distance between the first and second lens units L1 and L2 at the telephoto end is larger than that at the wide-angle end, the distance between the second and third lens units L2 and L3 at the telephoto end is smaller than that at the wide-angle end, and the distance between the third and fourth lens units L3 and L4 at the telephoto end is larger than that at the wide-angle end.

The aperture stop SP and the flare cutting stop FS move together with the third lens unit L3 during zooming.

The zoom lens of each embodiment is a rear-focus zoom lens which performs focusing by moving the fourth lens unit L4 along the optical axis (in an optical-axis direction).

The solid curve 4a and the dashed curve 4b respectively show the loci along which the fourth lens unit L4 is moved to compensate for the image plane variation during zooming in the case where an object at infinity and a close object are in focus.

Thus, the fourth lens unit L4 is moved along the locus that is convex toward the object side. Therefore, an air gap between the third lens unit L3 and the fourth lens unit L4 can be effectively used and the overall lens length can be effectively reduced.

Focusing from an object at infinity to a close object at the telephoto end is performed by moving the fourth lens unit L4 forward, as shown by the arrow 4c.

In the second embodiment shown in FIG. 3, the moving loci of the lens units, the aperture stop SP, and the flare cutting stop FS during zooming and focusing are similar to those in the first embodiment.

In the third embodiment shown in FIG. 5, the moving loci of the first, second and fourth lens units L1, L2, and L4 during zooming and focusing are similar to those in the first embodiment.

The third lens unit L3 is moved toward the object side during zooming from the wide-angle end to the telephoto end.

At this time, the lens units are moved such that the distance between the first and second lens units L1 and L2 at the telephoto end is larger than that at the wide-angle end, the distance between the second and third lens units L2 and L3 at the telephoto end is smaller than that at the wide-angle end, and the distance between the third and fourth lens units L3 and L4 at the telephoto end is larger than that at the wide-angle end.

The aperture stop SP moves toward the object side independently of the lens units during zooming from the wide-angle end to the telephoto end.

The flare cutting stop FS moves together with the third lens unit L3 or the second lens unit L2 during zooming.

In the fourth embodiment shown in FIG. 7, the moving loci of the lens units, the aperture stop SP, and the flare cutting stop FS during zooming and focusing are similar to those in the third embodiment.

In each embodiment, the first lens unit L1 is composed of a cemented lens including the first lens G11 having a negative refractive power and the second lens G12 having a positive refractive power arranged in order from the object side to the image side.

When Nd1a and vd1a are the refractive index and the Abbe number, respectively, of the material of the first lens G11 for the d-line, the following conditions are satisfied:

$$vd1a < 23.8 \quad (1)$$

$$Nd1a > 0.0186 \times vd1a + 1.594 \quad (2)$$

Next, the technical meaning of each of Conditional Expressions (1) and (2) will be described.

Conditional Expressions (1) and (2) relate to the relationship between the refractive index Nd1a and the Abbe number vd1a of the material of the first lens G11 having a negative refractive power which is included in the first lens unit L1.

If the Abbe number vd1a is greater than the upper limit of the range shown by Conditional Expression (1), the difference in the Abbe number between the material of the first lens G11 and the material of the second lens G12, which is bonded to the first lens G11, decreases. Therefore, if the power of the first lens unit L1 is maintained constant, the power of each of the first lens G11 and the second lens G12 and the curvature of each lens surface are increased.

In such a case, the spherical aberration and the axial chromatic aberration which occur at the first lens unit L1 excessively increase, and the spherical aberration and the axial chromatic aberration cannot be sufficiently corrected at the first lens unit L1. In addition, since the curvature of each lens surface increases, the lens thickness of the first lens unit L1 also increases and the overall lens length increases accordingly. In addition, the diameter of the front lens also increases. As a result, it becomes difficult to reduce the size of the entire system.

If the refractive index Nd1a is less than the lower limit of the range shown by Conditional Expression (2), the curvature of the lens surface of the first lens G11 increases, and the spherical aberration and the axial chromatic aberration which occur at the first lens unit L1 excessively increase. As a result, the spherical aberration and the axial chromatic aberration cannot be sufficiently corrected at the first lens unit L1.

In addition, since the curvature of each lens surface of the first lens G11 increases, the lens thickness of the first lens unit L1 increases and the overall lens length increases accordingly. In addition, the diameter of the front lens also increases. As a result, it becomes difficult to reduce the size of the entire system.

As described above, according to each embodiment, a small zoom lens having high performance over the entire zoom range from the wide-angle end to the telephoto end can be provided.

In particular, a high-refractive-index, high-dispersion maternal is effectively used to obtain a small, wide-field-angle zoom lens having a high zoom ratio (high magnification variation ratio) and high optical performance.

In general, the amount of aberration which occurs at the first lens unit L1 corresponds to a value obtained by multiplying the amount of aberration by the product of lateral magnifications of the second and the following lens units in the overall lens system.

Therefore, if the residual aberration at the first lens unit L1 is large, a large amount of aberration occurs in the entire lens system at the telephoto end, in particular, in a high-zoom-ratio (high-magnification-variation-ratio) zoom lens. Therefore, flare, reduction in resolution, and color bleed will increase and the image quality will be degraded.

In each embodiment, at least one of the conditions provided below can be satisfied.

In the expressions given below, m1 is a difference between the positions of the first lens unit L1 at the wide-angle end and the telephoto end along the optical axis. In addition, f1 and f2 are focal lengths of the first lens unit L1 and the second lens unit L2, respectively, fG1a is a focal length of the first lens G11, and fw is a focal length of the entire system at the wide-angle end.

The second lens unit L2 includes at least one positive lens and at least one negative lens.

Here, vd2a is the Abbe number for the d-line of the material of the positive lens which is positioned closest to the object side in the second lens unit L2.

Here, one or more of the following conditions can be satisfied:

$$m1/fw > 3.0 \quad (3)$$

$$|fG1a|/f1 > 2.0 \quad (4)$$

$$5.0 < f1/fw < 10.0 \quad (5)$$

$$0.10 < |f2/f1| < 0.25 \quad (6)$$

$$-2.0 < f2/fw < -0.7 \quad (7)$$

$$vd2a < 19.5 \quad (8)$$

Conditional Expression (3) relates to a displacement of the position of the first lens unit L1 at the telephoto end with respect to the position thereof at the wide-angle end.

If the value of Conditional Expression (3) is less than the lower limit thereof, the amount of movement of the first lens unit L1 during zooming is small. Therefore, the refractive power of the first lens unit L1 is to be increased to obtain a high zoom ratio. As a result, the spherical aberration and the axial chromatic aberration which occur at the first lens unit L1 excessively increase, and the spherical aberration and the axial chromatic aberration cannot be sufficiently corrected at the first lens unit L1.

In addition, since the curvature of the lens surface of the first lens G11 increases, the lens thickness of the first lens unit L1 also increases and the overall lens length increases accordingly. In addition, the diameter of the front lens also increases. As a result, it becomes difficult to reduce the size of the entire system.

Conditional Expression (4) relates to the focal length of the first lens G11 having a negative refractive power which is included in the first lens unit L1.

If the value of Conditional Expression (4) is less than the lower limit thereof, the power of each of the first lens G11 and the second lens G12 is increased when the focal length f1 of the first lens unit L1 is maintained constant. Therefore, the focal length fG1a of the first lens G11 is reduced and the value of Conditional Expression is reduced accordingly. In this case, the thickness of the first lens unit L1 is increased and it becomes difficult to reduce the size of the entire system.

Conditional Expression (5) relates to the focal length of the first lens unit L1, and shows a condition for achieving a reduction in the size of the entire optical system and an increase in the optical performance in a balanced manner by setting the refractive power of the first lens unit L1 to an adequate value.

If the refractive power of the first lens unit L1 is too strong and the value of Conditional Expression (5) is less than the lower limit thereof, the spherical aberration and the axial chromatic aberration which occur at the first lens unit L1 increase. Therefore, sufficient imaging performance cannot be obtained.

When the refractive power of the first lens unit L1 is too weak and the value of Conditional Expression (5) is greater than the upper limit thereof, the aberrations can be reliably corrected. However, the amount of movement of the first lens unit L1 to obtain a desired zoom ratio increases. Therefore, the overall lens length and the diameter of the front lens increase.

Conditional Expression (6) relates to the ratio between the refractive power of the second lens unit L2 and that of the first lens unit L1.

If the value of Conditional Expression (6) is less than the lower limit thereof, the negative refractive power of the second lens unit L2 is weak. Therefore, amounts of variations in air gaps between the second lens unit L2 and the first lens unit L1 and between the second lens unit L2 and the third lens unit L3 are to be increased to obtain a desired zoom ratio. As a result, the size of the optical system increases.

If the value of Conditional Expression (6) is greater than the upper limit thereof, the negative refractive power of the second lens unit L2 is too strong. Therefore, it becomes difficult to correct the aberrations which occur at the second lens unit L2 with a small number of lenses. Therefore, the overall lens length increases.

In addition, to obtain a high zoom ratio, the amount of movement of the second lens unit L2 or the third lens unit L3 is to be increased. Therefore, it becomes difficult to reduce the size of the entire system.

Conditional Expression (7) relates to the ratio between the focal length of the first lens unit L2 and the focal length of the entire system at the wide-angle end. The size of the entire lens system can be reduced while maintaining good optical performance by adequately setting the focal length of the second lens unit L2.

When the value of Conditional Expression (7) is less than the lower limit thereof, the negative refractive power of the second lens unit L2 is too weak. Therefore, the amounts of variations in the air gaps between the second lens unit L2 and the first lens unit L1 and between the second lens unit L2 and the third lens unit L3 are to be increased to perform desired zooming operation. As a result, the size of the optical system increases.

When the value of Conditional Expression (7) is greater than the upper limit thereof, the negative refractive power of the second lens unit L2 is too strong. Therefore, it becomes difficult to correct the aberrations which occur at the second lens unit L2 with a small number of lenses.

Conditional Expression (8) relates to the Abbe number for the d-line of the material of the positive lens which is positioned closest to the object side in the second lens unit L2.

In each embodiment, the positive lens which is positioned closest to the object side in the second lens unit L2 is made of a high-dispersion material, so that the aberrations which occur at the positive lens and the first lens unit L1 cancel each other. Thus, the coma aberrations can be effectively reduced.

If the dispersion of the material of the positive lens is low and the value of Conditional Expression (8) is less than the lower limit thereof, it becomes difficult to sufficiently correct the residual axial chromatic aberration at the first lens unit L1.

In each embodiment of the present invention, the numerical values or numerical ranges of Conditional Expressions (1) to (8) can be set as follows:

$$vd1a < 23.5 \tag{1a}$$

$$Nd1a > 0.0186 \times vd1a + 1.614 \tag{2a}$$

$$m1/fw > 3.2 \tag{3a}$$

$$|fG1a|/f1 > 2.5 \tag{4a}$$

$$6.0 < f1/fw < 9.5 \tag{5a}$$

$$0.13 < |f2/f1| < 0.22 \tag{6a}$$

$$-1.80 < f2/fw < -1.00 \tag{7a}$$

$$vd2a < 19.0 \tag{8a}$$

In the zoom lens of each embodiment, the distortion at the wide-angle end can be more reliably corrected by performing a known electrical aberration correction for the residual distortion at the wide-angle end. In such a case, higher optical performance can be obtained over the entire zoom range.

In addition, the second-order spectrum can also be more reliably corrected by performing an electrical aberration correction for the residual second-order spectrum. In such a case, higher optical performance can be obtained over the entire zoom range.

First to fourth numerical examples corresponding to the first to fourth embodiments of the present invention will now be described. In each numerical example, i denotes the number of each surface counted from the object side. In addition, ri shows the radius of curvature of the $i^{th}$ lens surface from the object side, di shows the lens thickness and the air distance for the $i^{th}$ lens surface from the object side, and ndi and vdi respectively show the refractive index and the Abbe number of the material of the $i^{th}$ lens from the object side for the d-line. Table 1 provided below shows the relationship between the above-described conditional expressions and the numerical examples.

When the optical axis is the X axis, an axis perpendicular to the optical axis is the H axis, the direction in which light travels is the positive direction, R is a paraxial radius of curvature, K is the conic constant, and A4, A6, A8, A10, and A12 are aspherical coefficients, the shape of the aspherical surface is expressed as follows:

$$X = \frac{(1/2)H^2}{1 + \sqrt{1 - (1+K)(H/R)^2}} + A4 \times H^4 + A6 \times H^6 + A8 \times H^8 + A10 \times H^{10} + A12 \times H^{12}$$

In the values of the aspherical coefficients, "e-Z", for example, means "10-Z." In each numerical example, the last two surfaces are surfaces of an optical block, such as a filter and a faceplate.

In addition, BF is a back focus, that is, an equivalent air distance between the last lens surface and a paraxial image plane. The overall lens length is the sum of the distance between the first lens surface and the last lens surface and the back focus BF. The symbol '*' is added to the surface numbers for the aspherical surfaces.

First Numerical Example

| Surface Data | | | | |
|---|---|---|---|---|
| Surface Number | r | d | nd | vd |
| 1 | 22.970 | 1.20 | 2.14352 | 17.8 |
| 2 | 19.412 | 3.98 | 1.77250 | 49.6 |
| 3 | 66.573 | (variable) | | |
| 4 | 33.962 | 0.95 | 1.88300 | 40.8 |
| 5 | 7.406 | 3.30 | | |
| 6 | 42.340 | 0.90 | 1.88300 | 40.8 |
| 7 | 10.414 | 2.70 | | |
| 8 | −32.227 | 0.80 | 1.80400 | 46.6 |
| 9 | 267.592 | 0.20 | | |
| 10 | 18.171 | 1.80 | 1.94595 | 18.0 |
| 11 | 229.649 | (variable) | | |
| 12 (stop) | ∞ | 0.8 | | |
| 13* | 9.011 | 2.20 | 1.57135 | 53.0 |
| 14* | −23.535 | 0.20 | | |
| 15 | 8.050 | 2.40 | 1.48749 | 70.2 |
| 16 | 34.497 | 0.70 | 2.00069 | 25.5 |
| 17 | 6.391 | 1.46 | | |
| 18 | −23.580 | 1.20 | 1.48749 | 70.2 |
| 19 | −8.935 | 0.5 | | |
| 20 (flare cutting stop) | ∞ | (variable) | | |
| 21 | 13.392 | 2.00 | 1.48749 | 70.2 |
| 22 | 109.205 | (variable) | | |
| 23 | ∞ | 1.10 | 1.51633 | 64.1 |
| 24 | ∞ | (variable) | | |
| image plane | ∞ | | | |

| Aspherical Surface Data |
|---|
| 13th surface |

K = 1.67568e+000  A4 = −6.15320e−004  A6 = −1.43803e−005
A8 = −1.12883e−006

14th surface

K = 8.33449e+000  A4 = 4.65523e−005  A6 = −1.10901e−005
A8 = −7.15697e−007

| Zoom Ratio 4.80 | | | |
|---|---|---|---|
| | Wide Angle | Intermediate | Telephoto |
| Focal Length | 5.31 | 11.01 | 25.47 |
| F-number | 2.88 | 3.8 | 5.14 |
| Field Angle | 41.22 | 22.89 | 10.34 |
| Image Height | 4.65 | 4.65 | 4.65 |
| Overall Lens Length | 54.16 | 54.92 | 75.18 |
| BF | 9.76 | 13.75 | 12.25 |
| d3 | 0.3 | 5.25 | 16.24 |
| d11 | 15.98 | 5.88 | 2.79 |
| d12 | 0.8 | 0.8 | 0.8 |
| d19 | 0.5 | 0.5 | 0.5 |
| d20 | 0.84 | 2.76 | 16.61 |
| d22 | 7.83 | 11.82 | 10.32 |
| d24 | 1.2 | 1.2 | 1.2 |

| Zoom Lens Unit Data | | |
|---|---|---|
| Unit No. | Front Surface | Focal Length |
| 1 | 1 | 48.22 |
| 2 | 4 | −7.42 |
| 3 | 13 | 14.38 |
| 4 | 21 | 31.1 |

Second Numerical Example

Surface Data

| Surface Number | r | d | nd | vd |
|---|---|---|---|---|
| 1 | 22.811 | 1.20 | 2.14352 | 23.0 |
| 2 | 19.270 | 4.01 | 1.77250 | 49.6 |
| 3 | 66.677 | (variable) | | |
| 4 | 34.364 | 0.95 | 1.88300 | 40.8 |
| 5 | 7.406 | 3.30 | | |
| 6 | 42.340 | 0.90 | 1.88300 | 40.8 |
| 7 | 10.360 | 2.70 | | |
| 8 | −32.418 | 0.80 | 1.80400 | 46.6 |
| 9 | 216.555 | 0.20 | | |
| 10 | 18.190 | 1.80 | 1.94595 | 18.0 |
| 11 | 258.918 | (variable) | | |
| 12 (stop) | ∞ | 0.8 | | |
| 13* | 9.022 | 2.20 | 1.57135 | 53.0 |
| 14* | −23.672 | 0.20 | | |
| 15 | 7.989 | 2.40 | 1.48749 | 70.2 |
| 16 | 34.505 | 0.70 | 2.00069 | 25.5 |
| 17 | 6.376 | 1.46 | | |
| 18 | −23.541 | 1.20 | 1.48749 | 70.2 |
| 19 | −8.880 | 0.5 | | |
| 20 (flare cutting stop) | ∞ | (variable) | | |
| 21 | 13.348 | 2.00 | 1.48749 | 70.2 |
| 22 | 112.180 | (variable) | | |
| 23 | ∞ | 1.10 | 1.51633 | 64.1 |
| 24 | ∞ | 0.60 | | |
| 25 | ∞ | (variable) | | |
| image plane | ∞ | | | |

Aspherical Surface Data

13th surface

K = 1.71688e+000  A4 = −6.19283e−004  A6 = −1.41082e−005
A8 = −1.16883e−006

14th surface

K = 8.22852e+000  A4 = 4.71779e−005  A6 = −1.11150e−005
A8 = −7.17419e−007

Zoom Ratio 4.80

| | Wide Angle | Intermediate | Telephoto |
|---|---|---|---|
| Focal Length | 5.3 | 11.01 | 25.46 |
| F-number | 2.88 | 3.8 | 5.15 |
| Field Angle | 41.24 | 22.89 | 10.35 |
| Image Height | 4.65 | 4.65 | 4.65 |
| Overall Lens Length | 54.02 | 54.79 | 75.06 |
| BF | 9.75 | 13.75 | 12.11 |
| d3 | 0.3 | 5.17 | 16.05 |
| d11 | 15.82 | 5.78 | 2.79 |
| d12 | 0.8 | 0.8 | 0.8 |
| d19 | 0.5 | 0.5 | 0.5 |
| d20 | 0.83 | 2.77 | 16.79 |
| d22 | 7.8 | 11.8 | 10.17 |
| d25 | 0.62 | 0.62 | 0.62 |

Zoom Lens Unit Data

| Unit No. | Front Surface | Focal Length |
|---|---|---|
| 1 | 1 | 47.66 |
| 2 | 4 | −7.36 |
| 3 | 13 | 14.35 |
| 4 | 21 | 30.88 |

Third Numerical Example

Surface Data

| Surface Number | r | d | nd | vd |
|---|---|---|---|---|
| 1* | 26.829 | 1.00 | 2.19000 | 16.0 |
| 2 | 22.252 | 4.53 | 1.71300 | 53.9 |
| 3 | −948.707 | 2.80 | | |
| 4 | 70.168 | (variable) | | |
| 5 | −1254.050 | 0.80 | 1.88300 | 40.8 |
| 6 | 7.695 | 3.05 | | |
| 7 | −62.590 | 0.70 | 1.60311 | 60.6 |
| 8 | 13.672 | 0.50 | | |
| 9 | 11.219 | 1.60 | 1.92286 | 18.9 |
| 10 | 28.193 | (variable) | | |
| 11 (stop) | ∞ | (variable) | | |
| 12* | 8.626 | 3.00 | 1.58313 | 59.4 |
| 13 | −29.774 | 2.05 | | |
| 14 | 19.457 | 0.70 | 1.92286 | 18.9 |
| 15 | 8.169 | 1.20 | | |
| 16 | −23.656 | 1.80 | 1.77250 | 49.6 |
| 17 | −13.258 | 0.7 | | |
| 18 (flare cutting stop) | ∞ | (variable) | | |
| 19 | 12.626 | 2.90 | 1.48749 | 70.2 |
| 20 | −63.100 | (variable) | | |
| 21 | ∞ | 0.80 | 1.51633 | 64.1 |
| 22 | ∞ | (variable) | | |
| image plane | ∞ | | | |

Aspherical Surface Data

1st surface

K = −5.42742e−002  A4 = −6.04082e−007  A6 = −5.34409e−009
A8 = −8.39208e−011  A10 = 5.68373e−013

12th surface

K = −7.57884e−001  A4 = −1.58211e−004  A6 = 9.41708e−007
A8 = 1.79919e−007  A10 = −3.02779e−008  A12 = 1.09413e−009

Zoom Ratio 9.55

| | Wide Angle | Intermediate | Telephoto |
|---|---|---|---|
| Focal Length | 6.24 | 21.22 | 59.61 |
| F-number | 2.62 | 3.32 | 4.47 |
| Field Angle | 29.76 | 9.55 | 3.43 |
| Image Height | 3.57 | 3.57 | 3.57 |
| Overall Lens Length | 58.56 | 63.4 | 79.08 |
| BF | 9.79 | 15.46 | 8.04 |
| d4 | 0.14 | 10.62 | 20.84 |
| d10 | 12.71 | 1.35 | 1.15 |
| d11 | 6.67 | 2.48 | 0.63 |
| d17 | 0.06 | 0.06 | 0.06 |
| d18 | 2.56 | 6.81 | 21.74 |
| d20 | 8.79 | 14.47 | 7.04 |
| d22 | 0.47 | 0.47 | 0.47 |

Zoom Lens Unit Data

| Unit No. | Front Surface | Focal Length |
|---|---|---|
| 1 | 1 | 41.59 |
| 2 | 5 | −8.47 |
| 3 | 12 | 17.31 |
| 4 | 19 | 21.86 |

Fourth Numerical Example

Surface Data

| Surface Number | r | d | nd | vd |
|---|---|---|---|---|
| 1* | 25.539 | 0.93 | 1.94500 | 17.0 |
| 2 | 20.112 | 4.60 | 1.71300 | 53.9 |
| 3 | 762.482 | 2.80 | | |
| 4 | 70.168 | (variable) | | |
| 5 | −1289.834 | 0.80 | 1.88300 | 40.8 |
| 6 | 7.383 | 3.05 | | |
| 7 | −61.871 | 0.70 | 1.60311 | 60.6 |
| 8 | 13.630 | 0.50 | | |
| 9 | 11.219 | 1.60 | 1.92286 | 18.9 |
| 10 | 28.193 | (variable) | | |
| 11 (stop) | ∞ | (variable) | | |
| 12* | 8.564 | 3.00 | 1.58313 | 59.4 |
| 13 | −29.086 | 2.05 | | |
| 14 | 18.675 | 0.70 | 1.92286 | 18.9 |
| 15 | 8.227 | 1.20 | | |
| 16 | −22.646 | 1.80 | 1.77250 | 49.6 |
| 17 | −13.233 | 0.13 | | |
| 18 (flare cutting stop) | ∞ | (variable) | | |
| 19 | 11.714 | 2.90 | 1.48749 | 70.2 |
| 20 | −934.940 | (variable) | | |
| 21 | ∞ | 0.80 | 1.51633 | 64.1 |
| 22 | ∞ | (variable) | | |
| image plane | ∞ | | | |

Aspherical Surface Data

1st surface

$K = 6.70164e-002$   $A4 = -1.70749e-006$   $A6 = -1.06262e-008$
$A8 = -6.47799e-011$   $A10 = 5.68373e-013$

12th surface

$K = -7.78289e-001$   $A4 = -1.57665e-004$   $A6 = 1.34233e-006$
$A8 = 6.78631e-008$   $A10 = -2.39089e-008$   $A12 = 1.09413e-009$

Zoom Ratio 9.44

| | Wide Angle | Intermediate | Telephoto |
|---|---|---|---|
| Focal Length | 6.25 | 20.35 | 58.99 |
| F-number | 2.61 | 3.38 | 4.44 |
| Field Angle | 29.75 | 9.95 | 3.46 |
| Image Height | 3.57 | 3.57 | 3.57 |
| Overall Lens Length | 57.12 | 63.56 | 77.41 |
| BF | 10.09 | 14.69 | 8.42 |
| d4 | 0.15 | 10.26 | 19.9 |
| d10 | 12.11 | 2.75 | 1.17 |
| d11 | 6.59 | 2.4 | 0.55 |
| d17 | 0.13 | 0.13 | 0.13 |
| d18 | 1.43 | 6.71 | 20.61 |
| d20 | 9.11 | 13.71 | 7.44 |
| d22 | 0.45 | 0.45 | 0.45 |

Zoom Lens Unit Data

| Unit No. | Front Surface | Focal Length |
|---|---|---|
| 1 | 1 | 40.3 |
| 2 | 5 | −8.12 |
| 3 | 12 | 16.76 |
| 4 | 19 | 23.76 |

TABLE 1

| | Conditional Expression | 1st Embodiment | 2nd Embodiment | 3rd Embodiment | 4th Embodiment |
|---|---|---|---|---|---|
| (1) | $vd1a$ | 17.8 | 23.0 | 16.0 | 17.0 |
| (2) | $Nd1a$ | 2.144 | 2.144 | 2.190 | 1.945 |
| | $0.0186 \times vd1a + 1.594$ | 1.925 | 2.022 | 1.892 | 1.910 |
| (3) | $m1/fw$ | 3.96 | 3.97 | 3.29 | 3.25 |
| (4) | $|fG1a|/f1$ | 2.77 | 2.78 | 2.99 | 2.71 |
| (5) | $f1/fw$ | 9.08 | 8.99 | 6.67 | 6.45 |
| (6) | $|f2/f1|$ | 0.15 | 0.15 | 0.20 | 0.20 |
| (7) | $f2/fw$ | −1.39 | −1.36 | −1.30 | −1.40 |
| (8) | $vd2a$ | 17.98 | 17.98 | 18.9 | 18.9 |

Although embodiments of the present invention have been described above, the present invention is, of course, not limited to the embodiments, and various modifications are possible within the scope of the present invention.

Next, a digital still camera including a zoom lens according to at least one of the above-described embodiments as an imaging optical system will be described with reference to FIG. 9.

Referring to FIG. 9, a camera body 20 includes an imaging optical system 21 including the zoom lens according to at least one of the first to fourth embodiments. A solid-state image pickup element (photoelectric conversion element) 22, such as a CCD sensor and a CMOS sensor, for receiving an object image formed by the imaging optical system 21 is disposed in the camera body 20. A memory 23 records information corresponding to the object image that is subjected to photoelectric conversion performed by the solid-state image pickup element 22. A finder 24 is formed of, for example, a liquid crystal display panel or the like and allows a user to observe the object image formed on the image-pickup element 22.

When the zoom lens according to at least one embodiment of the present invention is included in an image pickup apparatus, such as a digital still camera, a video camera, an electronic still camera, a broadcast camera, a surveillance camera, or a camera which uses silver-halide films, a small image pickup apparatus which provides high optical performance can be obtained.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-315545 filed Dec. 11, 2008, which is hereby incorporated by reference herein in its entirety.

What is claimed is:

1. A zoom lens comprising:
    a first lens unit having a positive refractive power;
    a second lens unit having a negative refractive power;
    a third lens unit having a positive refractive power; and
    a fourth lens unit having a positive refractive power,
    wherein the first, second, third and fourth lens units are arranged in order from the object side to the image side, respectively, wherein distances between the lens units are changed during zooming, wherein the first lens unit is composed of a cemented lens including a first lens having a negative refractive power and a second lens having a positive refractive power arranged in order from the object side to the image side, and wherein, when Nd1a and νd1a are a refractive index and an Abbe number, respectively, of a material of the first lens for a d-line, the following conditions are satisfied:

$$\nu d1a < 23.8$$

$$Nd1a > 0.0186 \times \nu d1a + 1.594,$$

wherein, when m1 is a difference between positions of the first lens unit at a wide-angle end and a telephoto end along an optical axis, f1 is a focal length of the first lens unit, fG1a is a focal length of the first lens, and fw is a focal length of the entire system of the zoom lens at the wide-angle end, the following conditions are satisfied:

$$m1/fw > 3.0$$

$$|fG1a|/f1 > 2.0.$$

2. The zoom lens according to claim 1,
wherein, when f2 is a focal length of the second lens unit and fw is a focal length of the entire lens system of the zoom lens at the wide-angle end, the following condition is satisfied:

$$-2.0 < f2/fw < -0.7.$$

3. The zoom lens according to claim 1,
wherein the second lens unit includes at least one positive lens and at least one negative lens.

4. The zoom lens according to claim 3,
wherein, when νd2a is an Abbe number for the d-line of a material of a positive lens which is closest to the object side in the second lens unit, the following condition is satisfied:

$$\nu d2a < 19.5.$$

5. The zoom lens according to claim 1, wherein the zoom lens forms an image on a solid-state image pickup element.

6. An image pickup apparatus, comprising:
the zoom lens according to claim 1; and
a solid-state image pickup element which receives an image formed by the zoom lens.

7. The zoom lens according to claim 1, wherein,
when f1 is a focal length of the first lens unit and fw is a focal length of the entire lens system of the zoom lens at the wide-angle end, the following condition is satisfied:

$$5.0 < f1/fw < 10.0.$$

8. The zoom lens according to claim 1, wherein,
when f1 is a focal length of the first lens unit and f2 is a focal length of the second lens unit, the following condition is satisfied:

$$0.10 < |f2/f1| < 0.25.$$

9. A zoom lens comprising:
a first lens unit having a positive refractive power;
a second lens unit having a negative refractive power;
a third lens unit having a positive refractive power; and
a fourth lens unit having a positive refractive power,
wherein the first, second, third and fourth lens units are arranged in order from the object side to the image side, respectively,
wherein distances between the lens units are changed during zooming,
wherein the first lens unit is composed of a cemented lens including a first lens having a negative refractive power and a second lens having a positive refractive power arranged in order from the object side to the image side, and
wherein, when Nd1a and νd1a are a refractive index and an Abbe number, respectively, of a material of the first lens for a d-line,
the following conditions are satisfied:

$$\nu d1a < 23.8$$

$$Nd1a > 0.0186 \times \nu d1a + 1.594,$$

wherein, when f1 is a focal length of the first lens unit and fw is a focal length of the entire lens system of the zoom lens at the wide-angle end, the following condition is satisfied:

$$5.0 < f1/fw < 10.0.$$

10. The zoom lens according to claim 9,
wherein, when f2 is a focal length of the second lens unit and fw is a focal length of the entire lens system of the zoom lens at the wide-angle end, the following condition is satisfied:

$$-2.0 < f2/fw < -0.7.$$

11. The zoom lens according to claim 9,
wherein the second lens unit includes at least one positive lens and at least one negative lens.

12. The zoom lens according to claim 9, wherein the zoom lens forms an image on a solid-state image pickup element.

13. An image pickup apparatus, comprising:
the zoom lens according to claim 9; and
a solid-state image pickup element which receives an image formed by the zoom lens.

14. A zoom lens comprising:
a first lens unit having a positive refractive power;
a second lens unit having a negative refractive power;
a third lens unit having a positive refractive power; and
a fourth lens unit having a positive refractive power,
wherein the first, second, third and fourth lens units are arranged in order from the object side to the image side, respectively,
wherein distances between the lens units are changed during zooming,
wherein the first lens unit is composed of a cemented lens including a first lens having a negative refractive power and a second lens having a positive refractive power arranged in order from the object side to the image side, and
wherein, when Nd1a and νd1a are a refractive index and an Abbe number, respectively, of a material of the first lens for a d-line, the following conditions are satisfied:

$$vd1a < 23.8$$

$$Nd1a > 0.0186 \times vd1a + 1.594,$$

wherein, when f1 is a focal length of the first lens unit and f2 is a focal length of the second lens unit, the following condition is satisfied:

$$0.10 < |f2/f1| < 0.25.$$

15. The zoom lens according to claim 14, wherein, when f2 is a focal length of the second lens unit and fw is a focal length of the entire lens system of the zoom lens at the wide-angle end, the following condition is satisfied:

$$-2.0 < f2/fw < -0.7.$$

16. The zoom lens according to claim 14, wherein the second lens unit includes at least one positive lens and at least one negative lens.

17. The zoom lens according to claim 14, wherein the zoom lens forms an image on a solid-state image pickup element.

18. An image pickup apparatus, comprising:
the zoom lens according to claim 14; and
a solid-state image pickup element which receives an image formed by the zoom lens.

19. A zoom lens, comprising:
a first lens unit having a positive refractive power;
a second lens unit having a negative refractive power;
a third lens unit having a positive refractive power; and
a fourth lens unit having a positive refractive power,
wherein the first, second, third and fourth lens units are arranged in order from the object side to the image side, respectively,
wherein distances between the lens units are changed during zooming,
wherein the first lens unit is composed of a cemented lens including a first lens having a negative refractive power and a second lens having a positive refractive power arranged in order from the object side to the image side, and
wherein, when Nd1a and vd1a are a refractive index and an Abbe number, respectively, of a material of the first lens for a d-line, and
wherein, when vd2a is an Abbe number for the d-line of a material of a positive lens which is closest to the object side in the second lens unit, the following conditions are satisfied:

$$vd1a < 23.8$$

$$Nd1a > 0.0186 \times vd1a + 1.594$$

$$vd2a < 19.5.$$

20. The zoom lens according to claim 19, wherein the second lens unit includes at least one positive lens and at least one negative lens.

21. The zoom lens according to claim 19, wherein the zoom lens forms an image on a solid-state image pickup element.

22. An image pickup apparatus, comprising:
the zoom lens according to claim 19; and
a solid-state image pickup element which receives an image formed by the zoom lens.

* * * * *